(12) United States Patent
Kimura et al.

(10) Patent No.: US 12,364,922 B2
(45) Date of Patent: Jul. 22, 2025

(54) NON-TRANSITORY COMPUTER-READABLE STORAGE MEDIUM HAVING STORED THEREIN GAME PROGRAM, INFORMATION PROCESSING SYSTEM, AND INFORMATION PROCESSING METHOD

(71) Applicant: NINTENDO CO., LTD., Kyoto (JP)

(72) Inventors: Miyuki Kimura, Kyoto (JP); Takumi Saito, Kyoto (JP); Ryo Kodama, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 311 days.

(21) Appl. No.: 18/120,008

(22) Filed: Mar. 10, 2023

(65) Prior Publication Data

US 2023/0293991 A1    Sep. 21, 2023

(30) Foreign Application Priority Data

Mar. 16, 2022   (JP) .................................. 2022-041917

(51) Int. Cl.
*A63F 13/47*    (2014.01)
*A63F 13/533*   (2014.01)
*A63F 13/803*   (2014.01)

(52) U.S. Cl.
CPC ............ *A63F 13/47* (2014.09); *A63F 13/533* (2014.09); *A63F 13/803* (2014.09)

(58) Field of Classification Search
CPC ........ A63F 13/40; A63F 13/426; A63F 13/45; A63F 13/47; A63F 13/50; A63F 13/51; A63F 13/533; A63F 13/537; A63F 13/55; A63F 13/56; A63F 13/57; A63F 13/70; A63F 13/803

See application file for complete search history.

(56) References Cited

U.S. PATENT DOCUMENTS

| | | |
|---|---|---|
| 9,687,741 B1* | 6/2017 | Kim ..................... A63F 13/2145 |
| 2009/0005139 A1* | 1/2009 | Morimoto ............... A63F 13/57 |
| | | 463/43 |
| 2011/0256912 A1* | 10/2011 | Baynes ................. A63F 13/803 |
| | | 463/43 |
| 2013/0244741 A1* | 9/2013 | Baynes .................. A63F 13/69 |
| | | 463/6 |
| 2016/0045828 A1* | 2/2016 | Bowron ................. A63F 13/56 |
| | | 463/31 |
| 2019/0030432 A1* | 1/2019 | Catlin .................... A63F 13/50 |
| 2021/0024102 A1* | 1/2021 | Kim ...................... A63F 13/803 |
| 2021/0031120 A1* | 2/2021 | Field ...................... G06F 30/00 |

(Continued)

FOREIGN PATENT DOCUMENTS

JP    11-347247    12/1999

*Primary Examiner* — Omkar A Deodhar
(74) *Attorney, Agent, or Firm* — Nixon & Vanderhye P.C.

(57) ABSTRACT

An example of a game system executes a racing game where a plurality of movement objects are moved in a course in a virtual space. The course includes a branch portion branching into a plurality of branch destinations, and the plurality of movement objects pass through the branch portion multiple times in progressing through the course. In the branch portion, a branch destination that a movement object is allowed to enter or a branch destination that the movement object is restricted from entering is switched in accordance with a degree of progress of the movement object in the racing game.

18 Claims, 18 Drawing Sheets

(56) References Cited

U.S. PATENT DOCUMENTS

| | | | |
|---|---|---|---|
| 2021/0170283 A1* | 6/2021 | Brown | A63F 13/352 |
| 2022/0288490 A1* | 9/2022 | Kaku | B60N 2/90 |
| 2023/0241498 A1* | 8/2023 | Wu | A63F 13/533 |
| | | | 463/6 |

* cited by examiner

F I G. 2
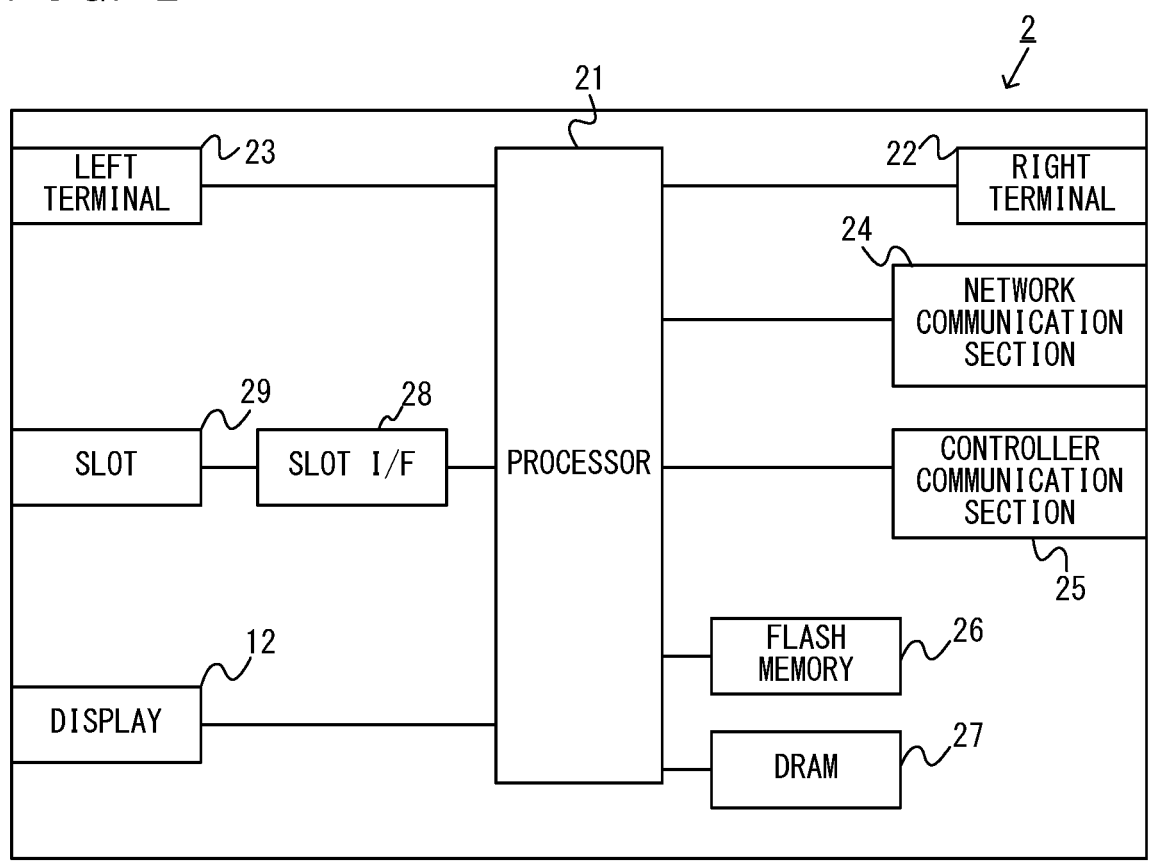

FIG. 3
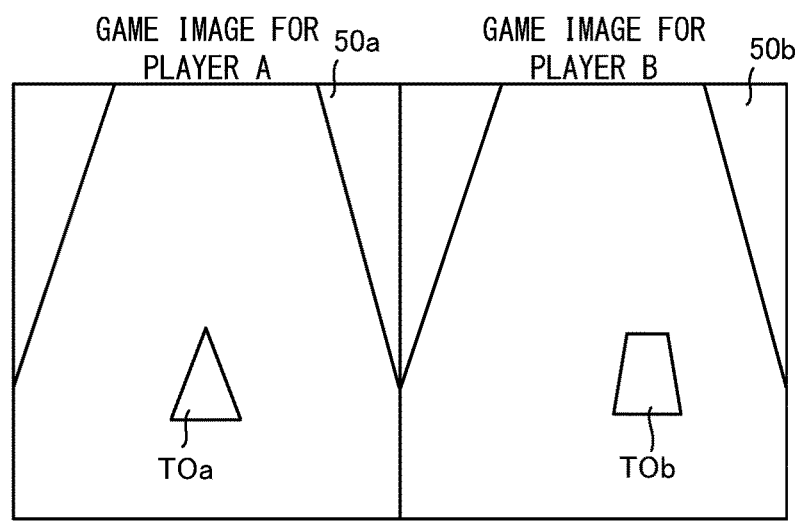
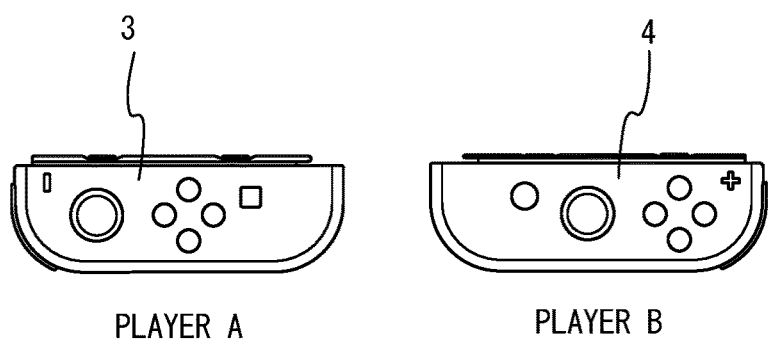
FIG. 4
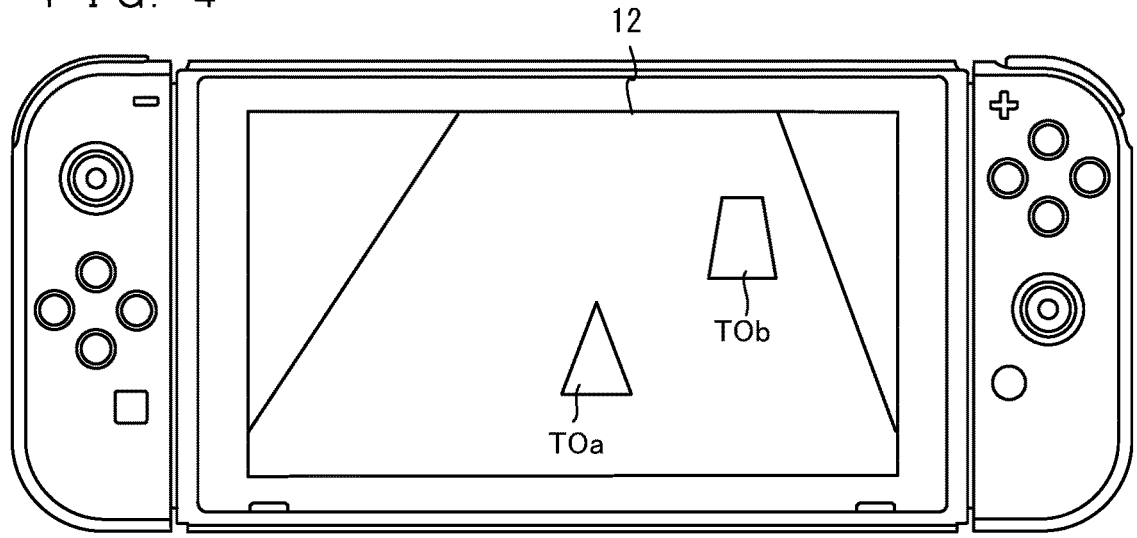

FIG. 16

| DEGREE OF PROGRESS OF MOVEMENT OBJECT | OBJECT SET | NUMBER OF LAPS |
|---|---|---|
| STARTING POINT (A POINT) - B POINT | OBJECT SET 1-A | FIRST LAP |
| B POINT - C POINT | OBJECT SET 1-B | FIRST LAP |
| C POINT - D POINT | OBJECT SET 1-C | FIRST LAP |
| D POINT - E POINT | OBJECT SET 2-D | SECOND LAP |
| E POINT - F POINT | OBJECT SET 2-E | SECOND LAP |
| F POINT - G POINT | OBJECT SET 2-F | SECOND LAP |
| G POINT - H POINT | OBJECT SET 2-G | SECOND LAP |
| H POINT - I POINT | OBJECT SET 3-H | THIRD LAP |
| I POINT - J POINT | OBJECT SET 3-I | THIRD LAP |
| J POINT - GOAL POINT | OBJECT SET 3-J | THIRD LAP |

FIG. 17

OBJECT SET 1-A (A-B POINTS)

| OBJECT IDENTIFIER |
|---|
| ENTRY PREVENTION OBJECT_P3 |

FIG. 18

OBJECT SET 2-D (D-E POINTS)

| OBJECT IDENTIFIER |
|---|
| ENTRY PREVENTION OBJECT_P1 |
| ENTRY PREVENTION OBJECT_P4 |
| ENTRY PREVENTION OBJECT_P12 |

FIG. 19

OBJECT SET 1-B (B-C POINTS)

| OBJECT IDENTIFIER |
| --- |
| ENTRY PREVENTION OBJECT_P3 |
| ACCELERATION OBJECT_P6_FIRST DIRECTION |
| ITEM BOX_P7 |

FIG. 20

OBJECT SET 2-E (E-F POINTS)

| OBJECT IDENTIFIER |
| --- |
| ACCELERATION OBJECT_P6_SECOND DIRECTION |
| ITEM BOX_P7 |
| ENTRY PREVENTION OBJECT_P8 |
| ITEM 64_P9 |
| ENTRY PREVENTION OBJECT_P10 |
| ENTRY PREVENTION OBJECT_P12 |

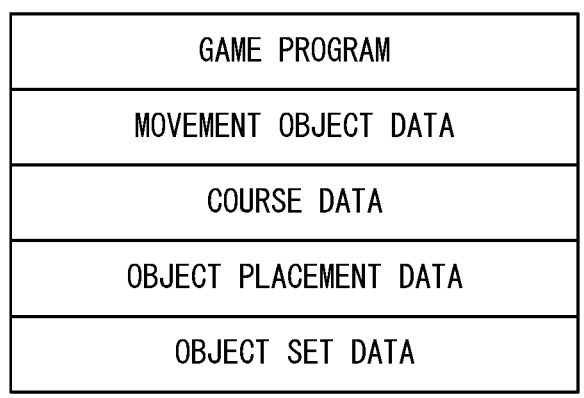
F I G. 2 2

NON-TRANSITORY COMPUTER-READABLE STORAGE MEDIUM HAVING STORED THEREIN GAME PROGRAM, INFORMATION PROCESSING SYSTEM, AND INFORMATION PROCESSING METHOD

CROSS REFERENCE TO RELATED APPLICATION

This application claims priority to Japanese Patent Application No. 2022-41917 filed on Mar. 16, 2022, the entire contents of which are incorporated herein by reference.

FIELD

An exemplary embodiment relates to a non-transitory computer-readable storage medium having stored therein a game program, an information processing system, and an information processing method that are capable of executing a racing game.

BACKGROUND AND SUMMARY

Conventionally, there is a racing game where a running body is caused to run on a course.

In the above conventional game, however, for example, in the case of a fixed route where the running body takes laps on a way on the course, the running body runs on the same path multiple times, and therefore, the conventional game is monotonous.

Therefore, it is an object of the exemplary embodiment to provide a non-transitory computer-readable storage medium having stored therein a game program, an information processing system, and an information processing method that are capable of varying paths in a racing game.

To achieve the above object, the exemplary embodiment employs the following configurations.

First Configuration

A game program according to a first configuration is a game program for causing a computer to execute a racing game that progresses by moving a plurality of movement objects in a course defined by a course object in a virtual space. The course includes a branch portion branching into a plurality of branch destinations. The plurality of movement objects pass through the branch portion multiple times in progressing through the course. The game program causes the computer to move an operation target object as an operation target of a player among the plurality of movement objects on the course based on an operation input provided by the player, allow the operation target object to enter at least one branch destination among the plurality of branch destinations and restrict the operation target object from entering any of the other branch destinations in the branch portion, and switch a branch destination that the operation target object is allowed to enter or a branch destination that the operation target object is restricted from entering in the branch portion in accordance with a degree of progress of the operation target object in the racing game, regardless of degrees of progress of the movement objects other than the operation target object in the racing game.

Based on the above, a branch destination that an operation target object is allowed to enter or a branch destination that the operation target object is restricted from entering is switched in accordance with the degree of progress of the operation target object in a racing game. Consequently, a moving body is caused to run on different ways on the same course, whereby it is possible to achieve a racing game including a variety of paths.

Second Configuration

In a second configuration, in the above first configuration, the game program may cause the computer to switch enabling and disabling of an entry control object that restricts entry to any of the other branch destinations or allows entry to the at least one branch destination in the branch portion.

Based on the above, an entry control object is enabled or disabled, whereby it is possible to switch the branch destination that the operation target object is allowed to enter or the branch destination that the operation target object is restricted from entering.

Third Configuration

In a third configuration, in the above second configuration, the course may include the entry control object in advance. The game program may cause the computer to switch enabling and disabling of display of the entry control object and/or a collision determination on the entry control object.

Based on the above, the enabling and disabling of the display of or a collision determination on an entry control object placed on the course in advance are switched, whereby it is possible to perform the above switching. Consequently, it is not necessary to construct a virtual space with respect to each movement object. Thus, it is possible to reduce the processing load.

Fourth Configuration

In a fourth configuration, in the above third configuration, the entry control object may be an entry prevention object that restricts entry to any of the other branch destinations, and the entry prevention object may be displayed so that a virtual space behind the entry prevention object can be viewed.

Based on the above, the viewing of the far direction of an entry prevention object is allowed, whereby, for example, even in a case where movement objects different in the degree of progress slip through the entry prevention object, it is possible to reduce discomfort.

Fifth Configuration

In a fifth configuration, in any of the above second to fourth configurations, the game program may cause the computer to generate a first image including the operation target object as the operation target of the player and a second image including a second movement object other than the operation target object as an operation target of the player among the plurality of movement objects, display the first image in a first area of a display screen, and display the second image in a second area of the display screen. The game program may cause the computer to switch the enabling and disabling of the entry control object in accordance with the degree of progress of the operation target object regardless of the degrees of progress of the movement objects other than the operation target object, thereby switching the branch destination that the operation target object is allowed to enter or the branch destination that the operation target object is restricted from entering in the branch portion, and switch the enabling and disabling of the entry control object in accordance with a degree of progress of the second movement object regardless of degrees of progress of the movement objects other than the second movement object, thereby switching a branch destination that the second movement object is allowed to enter or a branch destination that the second movement object is restricted from entering in the branch portion. The game program may cause the computer to perform a process of enabling or disabling display of the entry control object in the first image in accordance with the degree of progress of the operation target object, and perform a process of enabling or disabling display of the entry control object in the second image in accordance with the degree of progress of the second movement object.

Based on the above, it is possible to split a screen into screens, display a movement object on each screen, and cause the game to progress on each screen.

Sixth Configuration

In a sixth configuration, in any of the above first to fifth configurations, the racing game may be a game where the plurality of movement objects pass through a starting point on the course multiple times. The game program may cause the computer to perform the switching so that the branch destination that the operation target object is allowed to enter or the branch destination that the operation target object is restricted from entering differs between when the operation target object passes through the starting point a first number of times and when the operation target object passes through the starting point a second number of times in the branch portion.

Based on the above, in a racing game where movement objects take laps around a course, it is possible to vary paths on which the operation target object moves depending on the number of laps.

Seventh Configuration

In a seventh configuration, in the above sixth configuration, the game program may cause the computer to perform the switching after the operation target object passes through the starting point and until the operation target object reaches the starting point next.

Based on the above, it is possible to switch paths while the operation target object takes one lap on the course.

Eighth Configuration

In an eighth configuration, in the above sixth or seventh configuration, the game program may cause the computer to perform the switching for a next lap after the operation target object passes through the branch portion in a current lap and before the operation target object enters the next lap.

Based on the above, before the operation target object enters a next lap, it is possible to switch paths. For example, even in a case where the operation target object moves at high speed, it is possible to switch paths.

Ninth Configuration

In a ninth configuration, in any of the above first to eighth configurations, the game program may cause the computer to enable an object that advantageously or disadvantageously affects each of the movement objects in the racing game on the course in accordance with a degree of progress of the movement object regardless of degrees of progress of the movement objects other than the movement object.

Based on the above, it is possible to enable an object that advantageously or disadvantageously affects a movement object in the game in accordance with the degree of progress of each movement object.

Tenth Configuration

In a tenth configuration, in the above ninth configuration, the enabled object may be set to a first state or a second state, and if the object is enabled for the plurality of movement objects, a state of the object may be common to the plurality of movement objects.

Based on the above, even in a case where an object is enabled in accordance with the degree of progress of each movement object, it is possible to make the state of the object common.

Eleventh Configuration

In an eleventh configuration, in any of the above first to tenth configurations, the course may include a common path through which the plurality of movement objects pass multiple times during the racing game, and a moving direction in the common path is opposite between when the number of times the movement objects pass through the common path is a first number of times and when the number of times the movement objects pass through the common path is a second number of times.

Based on the above, it is possible to vary a moving direction in accordance with the degree of progress of a movement object. Thus, it is possible to give variations to a racing game.

Twelfth Configuration

In a twelfth configuration, in the above eleventh configuration, the game program may cause the computer to perform a process of enabling or disabling a movement change object that changes a movement form of each of the movement objects in a predetermined direction, and perform a process of enabling or disabling the movement change object in accordance with a degree of progress of the movement object so that when the movement object moves on the common path, a direction in which a moving direction and a movement form of the movement object are changed relate to each other.

Based on the above, for example, when a first direction is the moving direction in a case where the movement object has a first degree of progress, and a second direction is the moving direction in a case where the movement object has a second degree of progress, a movement change object can change a movement form in the first direction in a case where the movement object has the first degree of progress, and change the movement form in the second direction in a case where the movement object has the second degree of progress.

Thirteenth Configuration

A thirteenth configuration is an information processing system including a processor for executing a racing game that progresses by moving a plurality of movement objects relating to a plurality of players along a fixed route in a course defined by a course object in a virtual space. The course includes a branch portion branching into a plurality of branch destinations, and the fixed route is set so that the plurality of movement objects pass through the branch portion multiple times. The processor, based on an operation input provided by a player, moves the movement object relating to the player on the course, and allows the movement object to enter at least one branch destination among the plurality of branch destinations and restricts the movement object from entering any of the other branch destinations in the branch portion. The processor switches a branch destination that a first movement object relating to a first player is allowed to enter or a branch destination that the first movement object is restricted from entering in the branch portion in accordance with a degree of progress of the first movement object in the racing game, and switches a branch destination that a second movement object relating to a second player is allowed to enter or a branch destination that the second movement object is restricted from entering in the branch portion in accordance with the degree of progress of the second movement object in the racing game.

Based on the above, a branch destination that each movement object is allowed to enter or a branch destination that each movement object is restricted from entering is switched in accordance with the degree of progress of each movement object in a racing game. Consequently, it is possible to achieve a racing game having a variety of paths.

Fourteenth Configuration

In a fourteenth configuration, in the above thirteenth configuration, the information processing system may include a first information processing apparatus and a second information processing apparatus. The first information processing apparatus may move the first movement object on the course based on an operation input provided by the first player, allow the first movement object to enter at least one branch destination among the plurality of branch destinations and restrict the first movement object from entering any of the other branch destinations in the branch portion, and switch the branch destination that the first movement object is allowed to enter or the branch destination the first movement object is restricted from entering in the branch portion in accordance with the degree of progress of the first movement object. The second information processing apparatus may move the second movement object on the course based on an operation input provided by the second player, allow the second movement object to enter at least one branch destination among the plurality of branch destinations and restricts the second movement object from entering any of the other branch destinations in the branch portion, and switch the branch destination that the second movement object is allowed to enter or the branch destination the second movement object is restricted from entering in the branch portion in accordance with the degree of progress of the second movement object.

Another configuration may be an information processing system that executes the above game program, or may be an information processing apparatus, or may be an information processing method.

According to the exemplary embodiment, it is possible to switch a branch destination that an operation target object is allowed to enter or a branch destination that the operation target object is restricted from entering in a branch portion of a course in accordance with the degree of progress of the operation target object in a racing game.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 2 is an example non-limiting block diagram showing an example of the internal configuration of a main body apparatus;

FIG. 3 is an example non-limiting diagram showing an example of a game image in a case where a racing game is performed in a multiplay mode and in a case where the racing game is performed by two players using a single main body apparatus 2;

FIG. 4 is an example non-limiting diagram showing an example of a game image displayed on a screen of a display 12 in a case where the racing game is performed in a single play mode;

FIG. 16 is an example non-limiting diagram showing an example of a table where the degree of progress of a movement object and an object set is associated with each other;

FIG. 17 is an example non-limiting diagram showing an example of an object set 1-A;

FIG. 18 is an example non-limiting diagram showing an example of an object set 2-D;

FIG. 19 is an example non-limiting diagram showing an example of an object set 1-B;

FIG. 20 is an example non-limiting diagram showing an example of an object set 2-E;

FIG. 22 is an example non-limiting diagram showing examples of various pieces of data used in game processing performed by the game system 1;

DETAILED DESCRIPTION OF NON-LIMITING EXAMPLE EMBODIMENTS (Game System Configuration)

Figure 1:
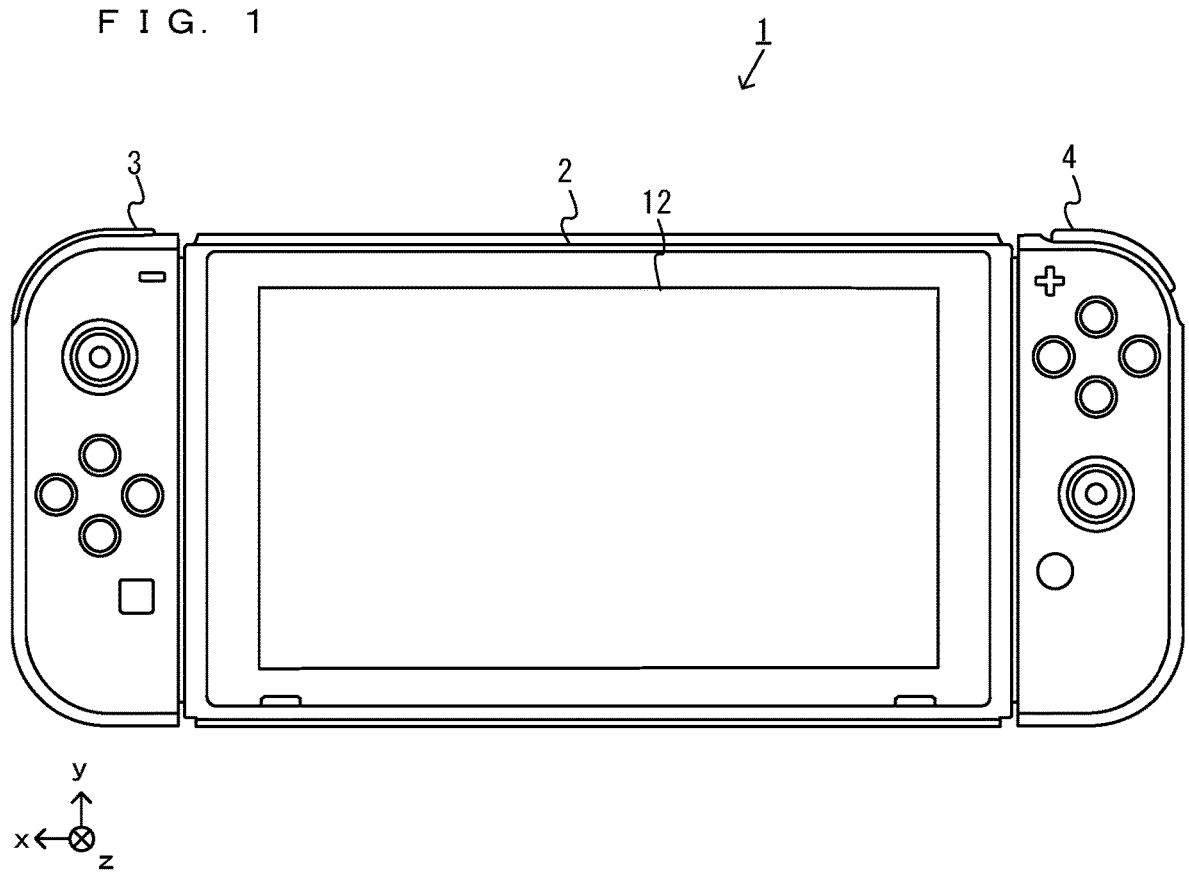
FIG. 1 is an example non-limiting diagram showing an example of a game system.

A game system according to an example of an exemplary embodiment is described below. FIG. 1 is a diagram showing an exemplary game system. An example of a game system 1 according to the exemplary embodiment includes a main body apparatus (an information processing apparatus; which functions as a game apparatus main body in the exemplary embodiment) 2, a left controller 3, and a right controller 4. The main body apparatus 2 is an apparatus for performing various processes (e.g., game processing) in the game system 1. The left controller 3 and the right controller 4 each include a plurality of buttons and an analog stick, as exemplary operation units through which a user performs input.

Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2, or the main body apparatus 2, the left controller 3, and the right controller 4 may be separated from one another, when being used. It should be noted that hereinafter, the left controller 3 and the right controller 4 will occasionally be referred to collectively as a "controller".

FIG. 2 is a block diagram showing an example of the internal configuration of the main body apparatus 2. As shown in FIG. 2, the main body apparatus 2 includes a processor 21. The processor 21 is an information processing section for executing various types of information processing (e.g., game processing) to be executed by the main body apparatus 2, and for example, includes a CPU (Central Processing Unit) and a GPU (Graphics Processing Unit). Note that the processor 21 may be configured only by a CPU, or may be configured by a SoC (System-on-a-Chip) that includes a plurality of functions such as a CPU function and a GPU function. The processor 21 executes an information processing program (e.g., a game program) stored in a storage section (specifically, an internal storage medium such as a flash memory 26, an external storage medium attached to the slot 29, or the like), thereby performing the various types of information processing.

Further, the main body apparatus 2 also includes a display 12. The display 12 displays an image generated by the main body apparatus 2. In the exemplary embodiment, the display 12 is a liquid crystal display device (LCD). The display 12, however, may be a display device of any type. The display 12 is connected to the processor 21. The processor 21 displays a generated image (e.g., an image generated by executing the above information processing) and/or an externally acquired image on the display 12.

Further, the main body apparatus 2 includes a left terminal 23, which is a terminal for the main body apparatus 2 to perform wired communication with the left controller 3, and a right terminal 22, which is a terminal for the main body apparatus 2 to perform wired communication with the right controller 4.

Further, the main body apparatus 2 includes a flash memory 26 and a DRAM (Dynamic Random Access Memory) 27 as examples of internal storage media built into the main body apparatus 2. The flash memory 26 and the DRAM 27 are connected to the processor 21. The flash memory 26 is a memory mainly used to store various data (or programs) to be saved in the main body apparatus 2. The DRAM 27 is a memory used to temporarily store various data used for information processing.

The main body apparatus 2 includes a slot 29. The slot 29 is so shaped as to allow a predetermined type of storage medium to be attached to the slot 29. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of a game application or the like) used by the main body apparatus 2 and/or a program (e.g., a game program or the like) executed by the main body apparatus 2.

The main body apparatus 2 includes a slot interface (hereinafter abbreviated as "I/F") 28. The slot I/F 28 is connected to the processor 21. The slot I/F 28 is connected to the slot 29, and in accordance with an instruction from the processor 21, reads and writes data from and to the predetermined type of storage medium (e.g., a dedicated memory card) attached to the slot 29.

The processor 21 appropriately reads and writes data from and to the flash memory 26, the DRAM 27, and each of the above storage media, thereby performing the above information processing.

The main body apparatus 2 includes a network communication section 24. The network communication section 24 is connected to the processor 21. The network communication section 24 performs wired or wireless communication with an external apparatus via a network. In the exemplary embodiment, as a first communication form, the network communication section 24 connects to a wireless LAN and communicates with an external apparatus, using a method compliant with the Wi-Fi standard. Further, as a second communication form, the network communication section 24 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 25. The controller communication section 25 is connected to the processor 21. The controller communication section 25 wirelessly communicates with the left controller 3 and/or the right controller 4. The communication method between the main body apparatus 2 and the left controller 3 and the right controller 4 is optional. In the exemplary embodiment, the controller communication section 25 performs communication compliant with the Bluetooth (registered trademark) standard with the left controller 3 and with the right controller 4.

The processor 21 is connected to the left terminal 23 and the right terminal 22. When performing wired communication with the left controller 3, the processor 21 transmits data to the left controller 3 via the left terminal 23 and also receives operation data from the left controller 3 via the left terminal 23. Further, when performing wired communication with the right controller 4, the processor 21 transmits data to the right controller 4 via the right terminal 22 and also receives operation data from the right controller 4 via the right terminal 22. As described above, in the exemplary embodiment, the main body apparatus 2 can perform both wired communication and wireless communication with each of the left controller 3 and the right controller 4.

It should be noted that, in addition to the elements shown in FIG. 2, the main body apparatus 2 includes a battery that supplies power and an output terminal for outputting images and audio to a display device (e.g., a television) separate from the display 12.

(Overview of Game)

Next, an overview of game processing executed by the game system 1 is described. A game according to the exemplary embodiment is a racing game where a plurality of movement objects are moved along a course. In the racing game, course objects defining the course (objects such as a road and a wall and a building provided at both ends of the road) are placed, and the movement objects are placed in a game space. The movement objects move along a fixed route in the course, whereby the racing game progresses. Here, the "fixed route" includes a way from a starting point to a goal point of the course where the racing game is performed.

Each movement object may be an object that moves on the ground, such as a vehicle, a motorcycle, a bicycle, a ski, or a tank, or may be an object that moves on or under water, such as a ship, a boat, or a submarine. The movement object may be an object that moves in the air, such as an airplane, a helicopter, or a glider. The movement object may be a character itself, and the racing game where the character itself runs or swims along the course may be performed.

If the movement object is an object that moves on the ground, such as a vehicle, the movement object moves along the course provided in the game space (a virtual space), but the movement object does not necessarily need to be always in contact with the course, and may be able to temporarily separate from the course and fly in the sky. The course may undulate up and down. If the movement object is an object that moves in the air, such as an airplane, the movement object moves along a course (a particular space) demarcated by, for example, an invisible tubular wall provided in the game space. In this case, the invisible wall may not be provided in some space, and the movement object moving in the air may temporarily freely move in the virtual space.

Hereinafter, the description is given on the assumption that the movement object is a vehicle object, and a car racing game where a plurality of vehicle objects move along a course is performed.

In the exemplary embodiment, there are a single play mode where a single player performs the game, and a multiplay mode where a plurality of players perform the game. In the single play mode, a single player controls a single movement object using the controllers 3 and/or 4, and the processor 21 of the main body apparatus 2 controls other one or more movement objects, whereby the racing game using a plurality of movement objects is performed.

The multiplay mode includes an offline multiplay mode where a plurality of players perform the racing game using a single main body apparatus 2, and a local communication multiplay mode where a plurality of players perform the racing game by connecting a plurality of main body apparatuses 2 through local communication. The multiplay mode also includes an online multiplay mode where a plurality of players perform the racing game using a plurality of main body apparatuses 2 connected to the Internet.

In the offline multiplay mode, a plurality of controllers are wirelessly connected to the main body apparatus 2, each of the plurality of players controls a movement object relating to the player using the controller 3 or 4.

In the local communication multiplay mode, the plurality of main body apparatuses 2 are connected to each other through local communication. Each player controls a movement object relating to the player using the controllers 3 and/or 4 connected to a main body apparatus 2 of the player. The main body apparatus 2 receives position information, action information, and the like regarding the movement object relating to another player through local communication. The main body apparatus 2 transmits position information, action information, and the like regarding the movement object relating to the player of the main body apparatus 2 to another main body apparatus 2 through local communication. Each main body apparatus 2 controls the movement object relating to the player of the main body apparatus 2 and also controls the movement object relating to the player of another main body apparatus based on data received from the other main body apparatus through local communication on the same course.

In the online multiplay mode, the plurality of main body apparatuses 2 are connected to the Internet. Each player controls a movement object relating to the player using the controllers 3 and/or 4. For example, each main body apparatus 2 receives position information, action information, and the like regarding the movement object relating to another player via a server on the Internet. The main body apparatus 2 transmits position information, action information, and the like regarding the movement object relating to the player of the main body apparatus 2 to another main body apparatus 2 via the server. Each main body apparatus 2 controls the movement object relating to the player of the main body apparatus 2 and also controls the movement object relating to the player of another main body apparatus based on data received from the other main body apparatus via the server on the same course.

FIG. 3 is a diagram showing an example of a game image in a case where the racing game is performed in the multiplay mode and in a case where the racing game is performed by two players using a single main body apparatus 2. The game image shown in FIG. 3 may be displayed on a screen of the display 12, or may be displayed on a screen of an external display device.

As shown in FIG. 3, for example, in a case where the racing game is performed by a player A and a player B, the player A controls a movement object TOa (an operation target object of the player A) using the controller 3. The player B controls a movement object TOb (an operation target object of the player B) using the controller 4. On the course in the game space, one or more movement objects TO automatically controlled by the processor 21 are present in addition to the movement objects TOa and TOb, and the racing game is performed by a plurality of movement objects including the movement objects TOa and TOb.

As shown in FIG. 3, in a case where the racing game is performed by two players, the screen is split into two parts on the left and right. A game image 50a on the left side is a game image for the player A, and the movement object TOa relating to the player A is displayed almost at the center of the game image 50a. A game image 50b on the right side is a game image for the player B, and the movement object TOb relating to the player B is displayed almost at the center of the game image 50b. Specifically, in the game space, a virtual camera VCa relating to the movement object TOa and a virtual camera VCb relating to the movement object TOb are set. The image capturing range of each virtual camera includes the relating movement object TO. For example, each virtual camera is set behind the relating movement object TO and moves in accordance with the movement of the movement object TO.

The racing game may be performed by three or more players using a single main body apparatus 2. For example, the racing game may be performed by four players by connecting four controllers to a single main body apparatus 2. In this case, the screen is split into four parts.

FIG. 4 is a diagram showing an example of a game image displayed on the screen of the display 12 in a case where the racing game is performed in the single play mode. The game image shown in FIG. 4 may be displayed on the screen of the external display device.

As shown in FIG. 4, in the single play mode, the game is performed on a single screen. The movement object TOa (the operation target object) operated by the player A of the main body apparatus 2 is displayed almost at the center of the screen. In the game space, the virtual camera VCa relating to the movement object TOa is set. The virtual camera VCa is set behind the movement object TOa and moves in accordance with the movement of the movement object TOa. As shown in FIG. 4. if the movement object TOb other than the operation target object and controlled by the processor 21 is present near the movement object TOa (in the image capturing range of the virtual camera VCa), the movement object TOb is also displayed. Further, another movement object controlled by the processor 21 may be displayed.

Also in the online multiplay mode and the local communication multiplay mode, similarly to FIG. 4, the game is performed on a single screen.

In a case where the racing game is performed in the single play mode, a display screen of the main body apparatus 2 (the screen of the display 12 or the external display device connected to the main body apparatus 2) may be split into a plurality of screens (e.g., two screens as shown in FIG. 3). In this case, for example, a movement object (an operation target object) controlled by a player may be displayed on a first screen, and a movement object controlled by the processor 21 may be displayed on a second screen. In a case where the racing game is performed in the local communication multiplay mode or the online multiplay mode, a single player uses a single main body apparatus 2, and a plurality of players use main body apparatuses 2 of the respective players. Also in this case, the display screen of each main body apparatus 2 may be split into a plurality of screens. For example, in a first area of the display screen, a movement object controlled by the player of the main body apparatus 2 may be displayed, and in a second area of the display screen, a movement object controlled by another player may be displayed. In a case where the racing game is performed in the local communication multiplay mode or the online multiplay mode, in a first area of the display screen, a movement object controlled by the player of the main body apparatus 2 may be displayed, and in a second area, a movement object controlled by another player may be displayed, and in a third area, a movement object controlled by the processor 21 may be displayed.

In the racing game according to the exemplary embodiment, a plurality of movement objects TO move on the course, and each movement object TO takes as many laps around the course as the number of times set in advance. The racing game according to the exemplary embodiment is a game where a plurality of movement objects compete for rankings (time) until the plurality of movement objects take as many laps as the number of times set in advance. The racing game may be a game where a plurality of movement objects compete for the action of each movement object, an item acquired by each movement object, the physical strength value of each movement object or the number of remaining machines at the time of the goal, or the like in the game. The racing game may be a game where a plurality of movement objects compete for points calculated based on rankings, actions, acquired items, or the like.

In the racing game according to the exemplary embodiment, the path through which a movement object TO passes changes in accordance with the degree of progress of the movement object TO in the racing game. Control is performed so that the path through which a movement object TO passes changes in accordance with the number of laps of the movement object TO. For example, control is performed so that the path in the first lap and the path in the second lap are different from each other. Using as an example a case where the racing game is performed by two players, a description is given below of a change in the path through which a movement object TO passes.

Figure 5:
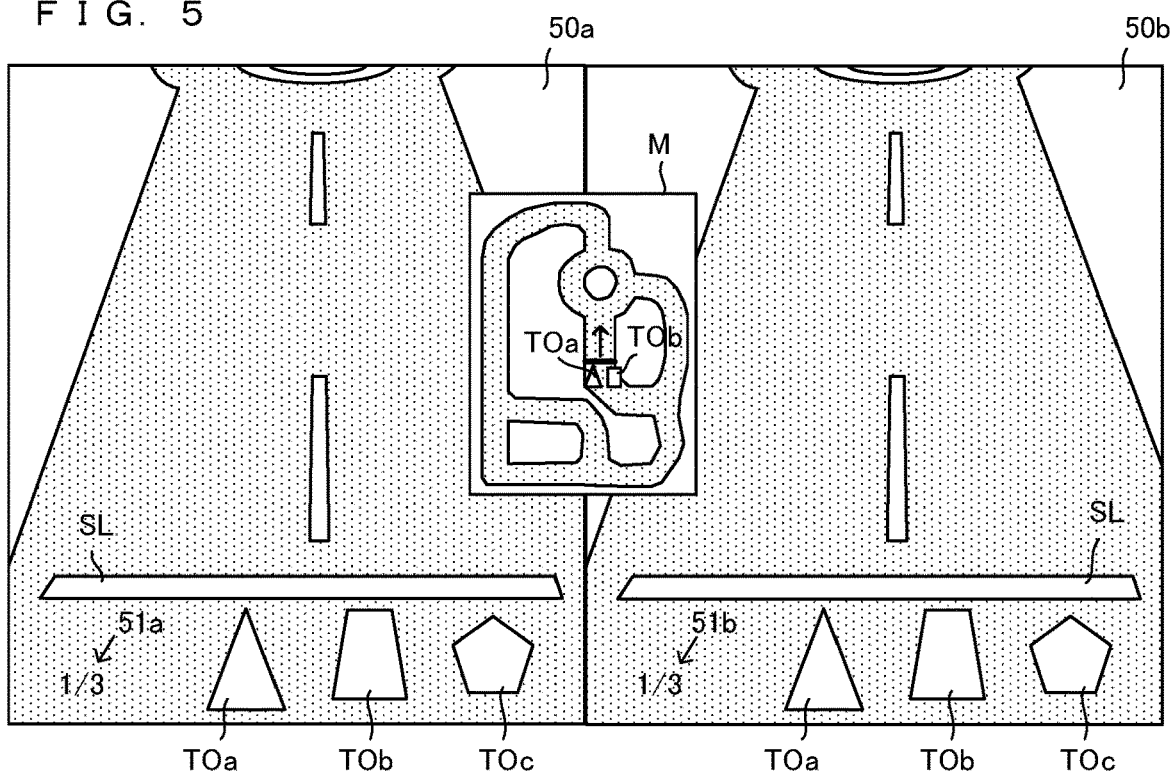
FIG. 5 is an example non-limiting diagram showing an example of a game image displayed on a screen of a display device at the start of the game in a case where the racing game is performed by two players using a single main body apparatus 2.

FIG. 5 is a diagram showing an example of a game image displayed on a screen of a display device at the start of the game in a case where the racing game is performed by two players using a single main body apparatus 2.

As shown in FIG. 5, the game image 50a for the player A is displayed on the left side of the screen, and the game image 50b for the player B is displayed on the right side of the screen. Since FIG. 5 shows the start of the racing game, a portion around the starting point of the course is displayed in the game images 50a and 50b. Specifically, in the game images 50a and 50b, the movement object TOa controlled by the player A, the movement object TOb controlled by the player B, and a movement object TOc controlled by the processor 21 are displayed on the near side of a starting line SL. In addition to these three movement objects TO, one or more movement objects TO controlled by the processor 21 may be displayed.

During the racing game, a map image M representing the entirety of the course where the racing game is performed is displayed almost at the center of the screen in a superimposed manner on the game images 50a and 50b. In the map image M, an image of the entirety of the course and an icon representing each movement object TO are displayed. The icon representing each movement object TO in the map image M indicates the current position of the movement object TO. In the figures other than FIG. 5, the map image M is omitted for simplicity.

In the game image 50*a*, number-of-laps display 51*a* indicating the current number of laps of the movement object TOa is displayed. The numerator of the number-of-laps display 51*a* indicates the current number of laps, and the denominator of the number-of-laps display 51*a* indicates the total number of laps of this racing game. For example, the number-of-laps display 51*a* "2/3" indicates that if the movement object TOa takes three laps around the course (if the movement object TOa passes through the starting line SL three times), the movement object TOa reaches the goal, and the current lap is the second lap. Similarly, in the game image 50*b*, number-of-laps display 51*b* indicating the current number of laps of the movement object TOb is displayed.

If the racing game is started, the player A moves the movement object TOa in a forward direction set in advance on the course by providing an operation input to the controller 3. Here, the "forward direction" refers to a direction along the fixed route, and a direction set in advance as a regular moving direction in the racing game. For example, if a predetermined button of the controller 3 is pressed, the movement object TOa moves forward. In accordance with the input direction of an analog stick of the controller 3, the moving direction of the movement object TOa is changed. Similarly, in accordance with an operation input to the controller 4, the movement object TOb is controlled. The player controls the moving direction using the analog stick while pressing the predetermined button of the controller, thereby moving the operation target object in the forward direction. Alternatively, the moving direction of the operation target object may be automatically corrected so that the operation target object moves in the forward direction.

Figure 6:
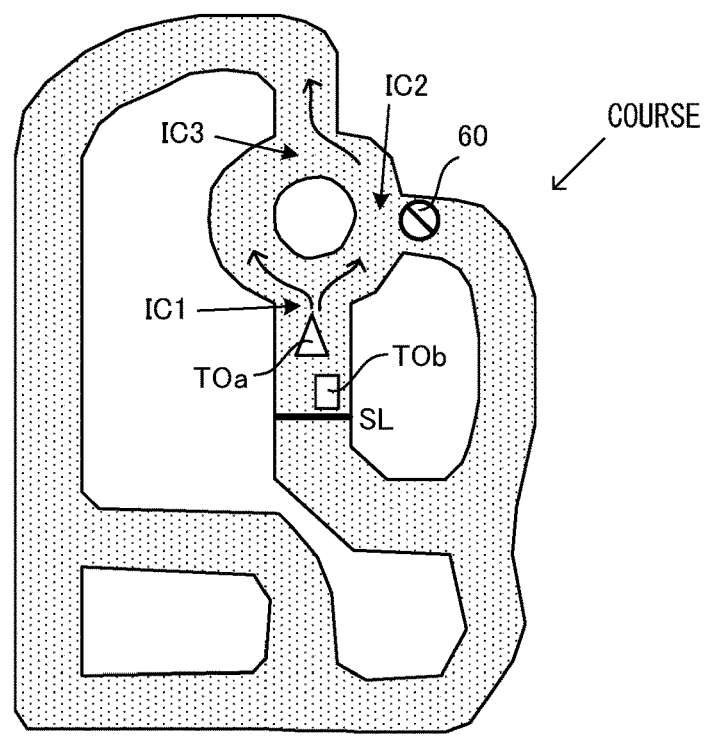
FIG. 6 is an example non-limiting diagram schematically representing the entirety of a course after the racing game is started, and is an example non-limiting diagram representing a course for a player A.
Figure 7:
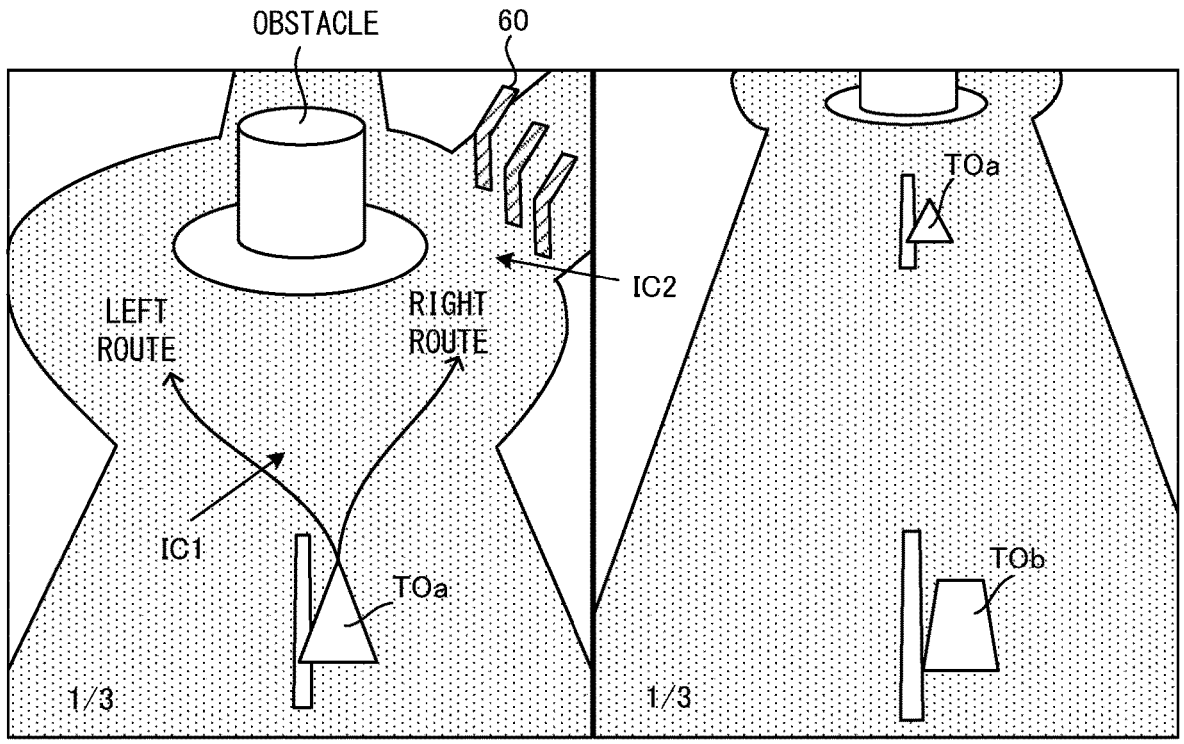
FIG. 7 is an example non-limiting diagram showing an example of a game image displayed on the screen in the state shown in FIG. 6.
Figure 8:
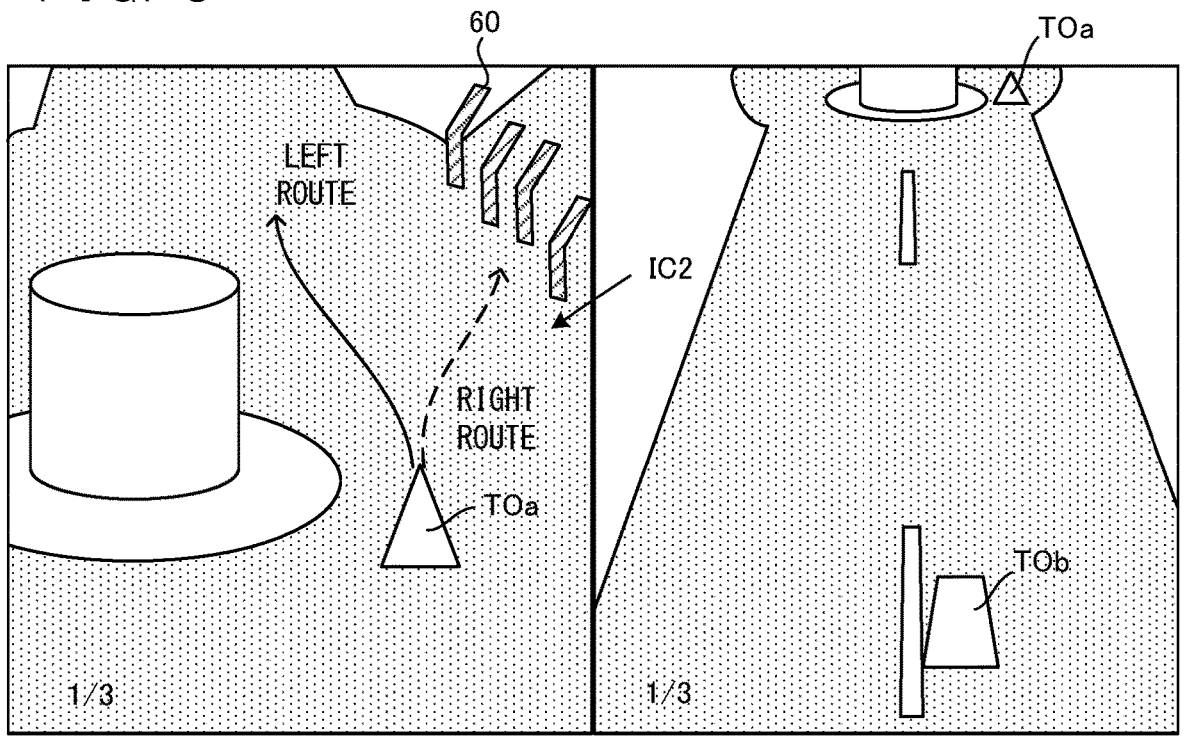
FIG. 8 is an example non-limiting diagram showing an example of a game image displayed on the screen when a movement object TOa reaches the neighborhood of a branch portion IC2.

FIG. 6 is a diagram schematically representing the entirety of the course after the racing game is started, and is a diagram representing a course for the player A. FIG. 7 is a diagram showing an example of a game image displayed on the screen in the state shown in FIG. 6. FIG. 8 is a diagram showing an example of a game image displayed on the screen when the movement object TOa reaches the neighborhood of a branch portion IC2. Arrows and characters drawn on the course and indicating routes in the figures are display for description, and are not actually displayed in the game images.

As shown in FIG. 6, after the racing game is started, based on an operation input provided to the controller 3, the movement object TOa moves over the starting line SL and in the forward direction (the up direction in FIG. 6) along the course and reaches the neighborhood of a branch portion IC1. At this time, a game image shown in FIG. 7 is displayed. The movement object TOb is present at a position behind the movement object TOa and slightly over the starting line SL.

Here, the course includes a plurality of branch portions branching into a plurality of branch destinations. A single branch portion may branch into three or more branch destinations.

Specifically, the branch portion IC1 divides the moving path of the movement object TO into a left route and a right route. An obstacle is present in the straight forward direction, and therefore, the movement object TO can pass through only the left route or the right route divided by the branch portion ICE In other words, if the movement object TOa reaches the branch portion IC1, the player A can select both the left route and the right route as the path in which the movement object TOa moves forward.

If the movement object TOa passes through the right route in the branch portion IC1, the movement object TOa reaches a branch portion IC2. At this time, a game image shown in FIG. 8 is displayed.

As shown in FIGS. 6 and 8, the branch portion IC2 branches into left and right routes. On the right route in the branch portion IC2, however, an entry prevention object 60 (an example of an entry control object) is present. The entry prevention object 60 restricts entry to at least one branch destination among a plurality of branch destinations in a branch portion. The movement object TOa cannot move forward on the right route in the branch portion IC2 (a route indicated by a dashed arrow in FIG. 8) due to the entry prevention object 60, and can move forward only on the left route in the branch portion IC2 (a route indicated by a solid arrow in FIG. 8). For example, if the movement object TOa moves along the route indicated by the dashed arrow in FIG. 8, the movement object TOa collides with the entry prevention object 60 and is stopped or decelerated. Thus, the movement object TOa cannot move forward beyond the entry prevention object 60.

The entry prevention object 60 is displayed so that a part of the course beyond the entry prevention object 60 (a part of the game space in the far direction of the right route in the branch portion IC2) can be viewed. For example, the entry prevention object 60 may be displayed translucently. The entry prevention object 60 may be formed by arranging a plurality of opaque or translucent objects at predetermined intervals and may be formed so that a part of the game space beyond the entry prevention object 60 (the far direction) can be viewed through the gaps between the objects. The entry prevention object 60 may be an object displayed such that a plurality of translucent or opaque objects flow in a certain direction so that a part of the course beyond the entry prevention object 60 can be viewed.

The entry prevention object 60 suggests the direction in which the movement object TO should move forward. For example, the entry prevention object 60 may include an image suggesting the direction. In FIG. 8, the entry prevention object 60 suggests the left direction.

In the first lap in the racing game, since the entry prevention object 60 that restricts entry to the right route in the branch portion IC2 is present, the player A controls the movement object TOa to pass through the left route in the branch portion IC2. Further, immediately after that, the movement object TOa reaches a branch portion IC3 (see FIG. 6) that branches into left and right routes. The movement object TOa having reached the branch portion IC3 moves forward on the right route, which is the forward direction of the race.

Figure 9:
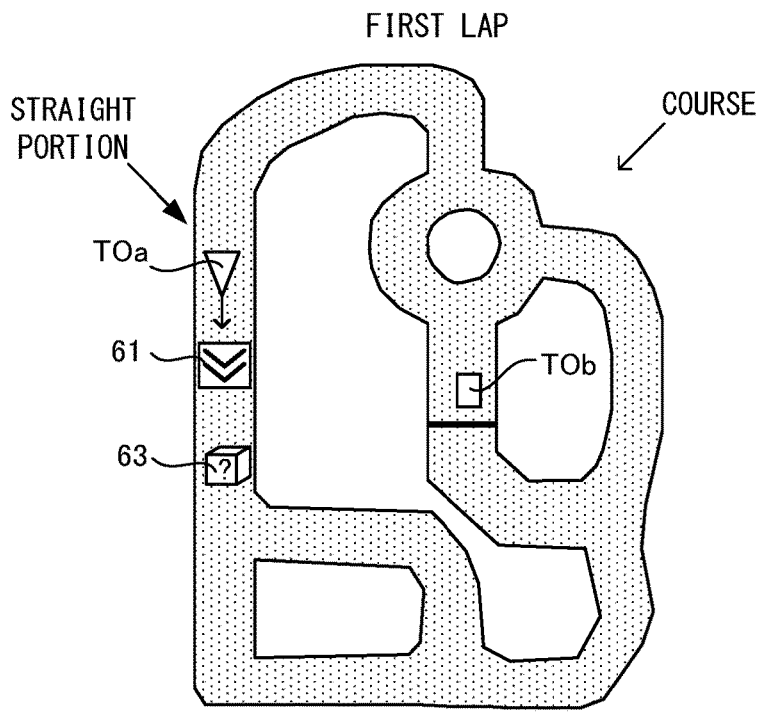
FIG. 9 is an example non-limiting diagram schematically representing the entirety of the course after the movement object TOa passes through a branch portion IC3, and is an example non-limiting diagram representing the course for the player A.
Figure 10:
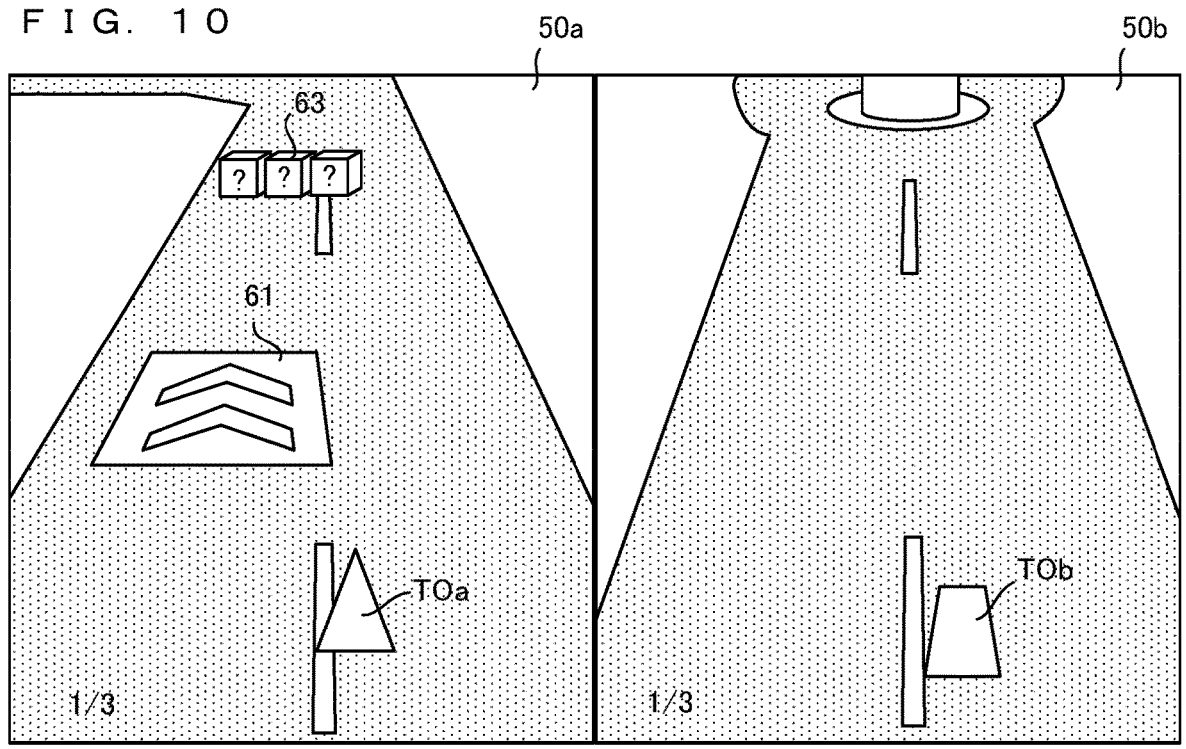
FIG. 10 is an example non-limiting diagram showing an example of a game image displayed on the screen in the state shown in FIG. 9.

FIG. 9 is a diagram schematically representing the entirety of the course after the movement object TOa passes through the branch portion IC3, and is a diagram representing the course for the player A. FIG. 10 is a diagram showing an example of a game image displayed on the screen in the state shown in FIG. 9.

As shown in FIG. 9, the movement object TOa reaches a straight portion of the course and is moving in the forward direction (the down direction in FIG. 9) in the straight portion. On the other hand, for example, since an operation input is not provided to the controller 4 by the player B, the movement object TOb remains near the starting point. At this time, a game image shown in FIG. 10 is displayed.

As shown in FIGS. 9 and 10, in the straight portion of the course, an acceleration object 61 and an item box 63 are placed.

The acceleration object 61 is an object placed on the course, is an object that advantageously affects a movement object TO in the racing game, and is an object that changes the movement form of the movement object in a predetermined direction. The acceleration object 61 accelerates the movement object TO, thereby increasing the velocity of the movement object TO only for a predetermined time. As shown in FIG. 10, the acceleration object 61 is placed to cover a part of the course. If the movement object TO passes over the acceleration object 61, the movement object TO is accelerated. Thus, the movement object TO having passed over the acceleration object 61 enters an advantageous state in the racing game.

The item box 63 is an object placed on the course (on the road surface or at a position higher than the road surface) and is an object that stores an item to be used in the racing game. In the game according to the exemplary embodiment, a plurality of items that advantageously or disadvantageously affect the movement object TO in the racing game are prepared. If the movement object TO collides with the item box 63, the movement object TO acquires any of the plurality of items. Which of the plurality of items is to be acquired may be randomly determined using a random number, or may be set in advance.

The plurality of items may be items that make the movement object TO having acquired the items advantageous in the game. For example, the plurality of items may include an item that increases the velocity of the movement object TO having acquired the item, an item that disables or reduces an attack from another movement object, an item that increases the defensive strength of the movement object TO having acquired the item, an item that makes an attack on another movement object, an item that disturbs the running of another movement object, and an item that stops or decelerates another movement object. These items may be able to be used by the player at any timing, or may be used automatically (e.g., simultaneously with the acquisition).

As shown in FIG. 10, a plurality of item boxes 63 are placed. If any of the plurality of item boxes 63 is acquired by the movement object TOa, the acquired item box 63 disappears. Thus, another movement object TO cannot acquire the item box 63 acquired by the movement object TOa. After an item box 63 placed in the game space is acquired by a movement object TO, and in a case where a predetermined condition holds true (e.g., a case where a predetermined time elapses after the item box 63 is acquired, a case where the movement object TO having acquired the item box 63 ends the current lap, or the like), the item box 63 may be able to be acquired again.

The movement object TOa further moves from the position shown in FIGS. 9 and 10 along the path of the course, moves over the starting line SL, and enters the second lap. On the other hand, an operation input is provided to the controller 4 by the player B, and the movement object TOb moves over the starting line SL and moves to the neighborhood of the branch portion IC1 (the first lap).

Figure 11:
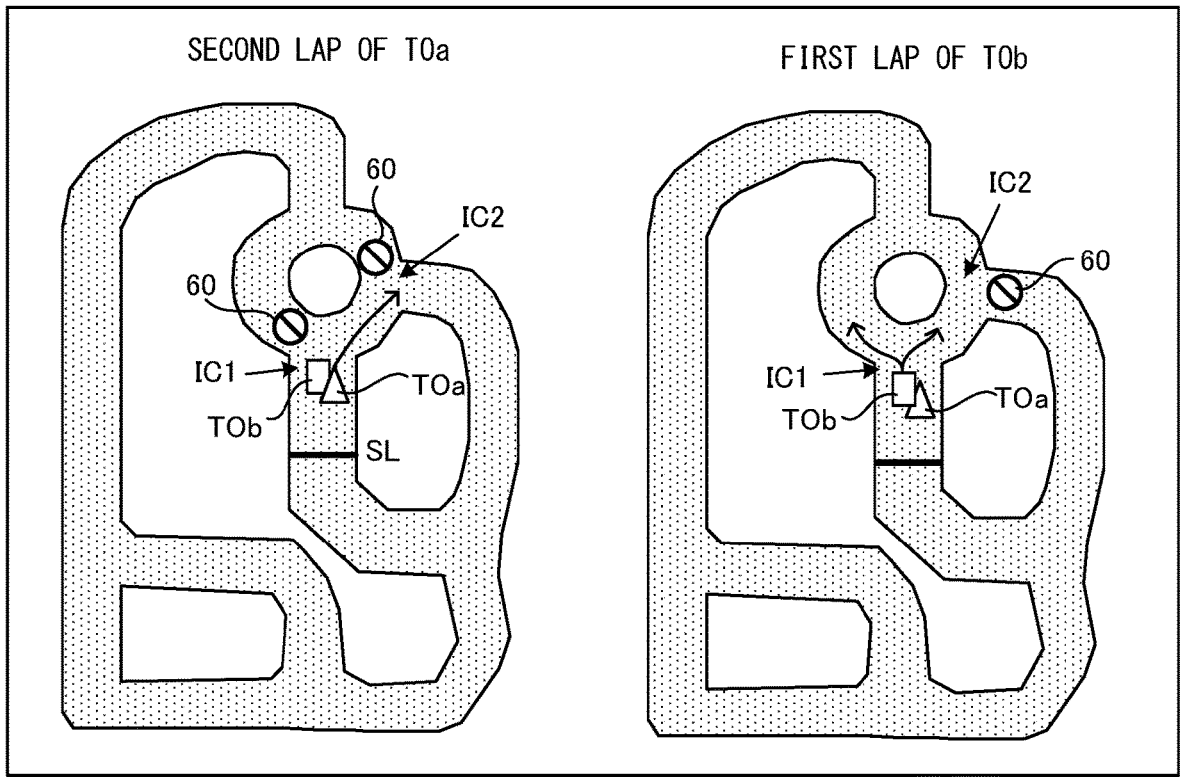
FIG. 11 is an example non-limiting diagram schematically representing the entirety of the course when the movement object TOa reaches a branch portion IC1 in the second lap, and a movement object TOb reaches the branch portion IC1 in the first lap.
Figure 12:
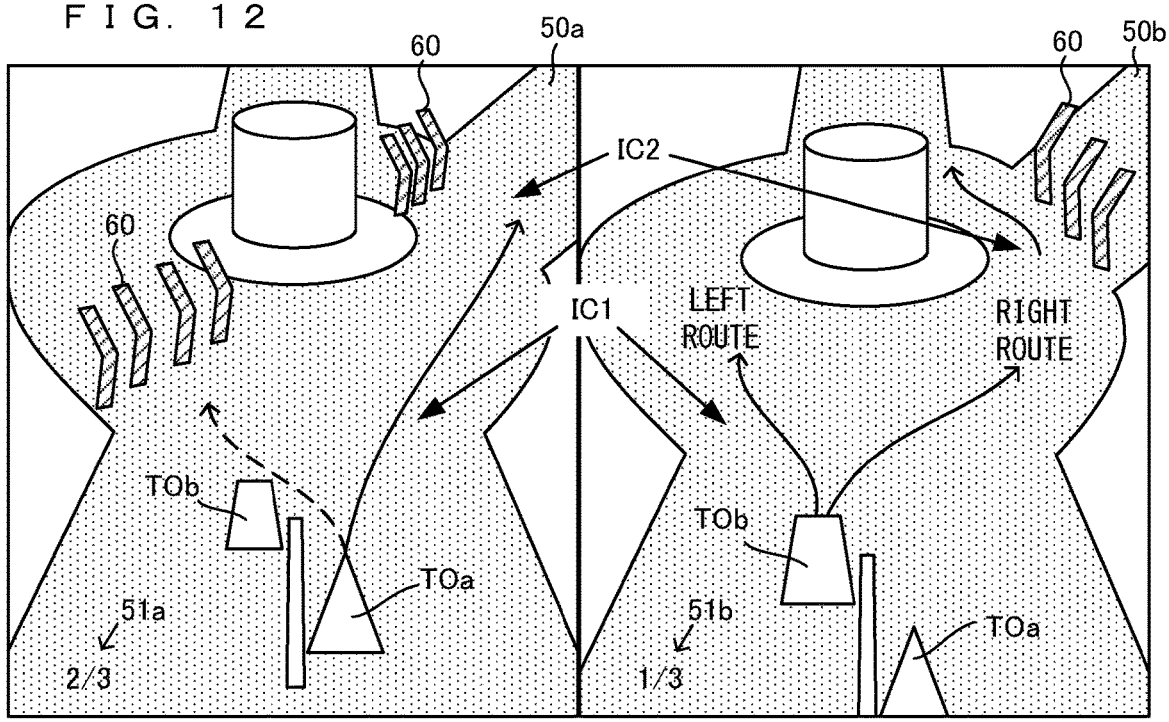
FIG. 12 is an example non-limiting diagram showing an example of a game image displayed on the screen in the state shown in FIG. 11.

FIG. 11 is a diagram schematically representing the entirety of the course when the movement object TOa reaches the branch portion IC1 in the second lap, and the movement object TOb reaches the branch portion IC1 in the first lap. FIG. 12 is a diagram showing an example of a game image displayed on the screen in the state shown in FIG. 11.

The left diagram of FIG. 11 is a diagram representing the course for the player A. The right diagram of FIG. 11 is a diagram representing a course for the player B. These diagrams represent the same time.

As shown in the left diagram of FIG. 11 and the game image 50*a* on the left side of FIG. 12, if the movement object TOa reaches the neighborhood of the branch portion IC1 in the second lap, an entry prevention object 60 is present to block the left route in the branch portion ICE Also in the branch portion IC2, an entry prevention object 60 is present to block the left route. Thus, in the second lap, the movement object TOa passes through the right routes in the branch portion IC1 and the branch portion IC2.

On the other hand, as shown in the right diagram of FIG. 11 and the game image 50*b* on the right side of FIG. 12, the movement object TOb is in the first lap, and an entry prevention object 60 is present at the same position as that in the first lap of the movement object TOa. Specifically, in the first lap, an entry prevention object 60 is not placed in the branch portion IC1, and the movement object TOb can pass through the left route and the right route in the branch portion ICE In the first lap, an entry prevention object 60 is present to block the right route in the branch portion IC2. Thus, if the movement object TOb reaches the branch portion IC2, the movement object TOb passes through the left route in the branch portion IC2.

As shown in FIG. 12, if the image capturing range of the virtual camera VCa relating to the movement object TOa includes the movement object TOa and the movement object TOb, the movement object TOa and the movement object TOb are displayed in the game image 50*a*. In the game image 50*a*, an entry prevention object 60 is placed to block the left route in the branch portion IC2, and therefore, if the movement object TOa moves forward on the left route in the branch portion IC2, the movement object TOa collides with the entry prevention object 60 and cannot move forward beyond the entry prevention object 60. On the other hand, the movement object TOb can pass through the left route in the branch portion IC2. If the movement object TOb passes through the left route in the branch portion IC2, in the game image 50*a*, the movement object TOb does not collide with the entry prevention object 60, and moves forward by slipping through the entry prevention object 60. Since the entry prevention object 60 is configured so that the game space beyond the entry prevention object 60 (a part of the course) can be viewed, the player A can view the game image 50*a* and recognize that the movement object TOb moves forward on the left route in the branch portion IC2.

Similarly, if the image capturing range of the virtual camera VCb relating to the movement object TOb includes the movement object TOa and the movement object TOb, the movement object TOa and the movement object TOb are displayed in the game image 50*b*. In the game image 50*b*, an entry prevention object 60 is present to block the right route in the branch portion IC2, and therefore, if the movement object TOb moves forward on the right route in the branch portion IC2, the movement object TOb collides with the entry prevention object 60 and cannot move forward beyond the entry prevention object 60. On the other hand, the movement object TOa can pass through the right route in the branch portion IC2. If the movement object TOa passes through the right route in the branch portion IC2, in the game image 50*b*, the movement object TOa moves forward by slipping through the entry prevention object 60. Since the entry prevention object 60 is configured so that the game space beyond the entry prevention object 60 (a part of the course) can be viewed, the player B can view the game image 50*b* and recognize that the movement object TOa moves forward on the right route in the branch portion IC2.

Figure 13A:
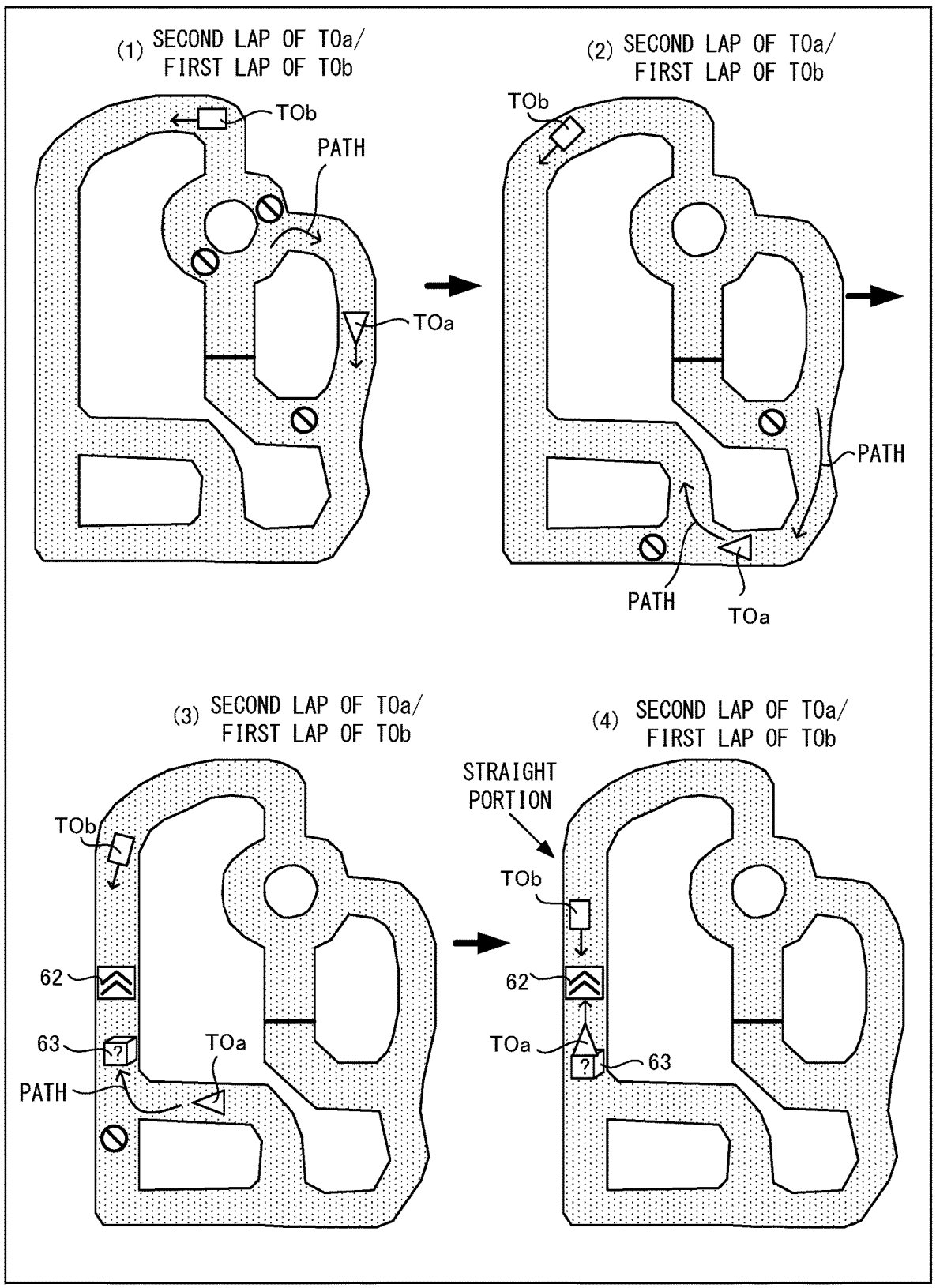
FIG. 13A is an example non-limiting diagram schematically representing the entirety of the course when the racing game further progresses after FIG. 12, and is an example non-limiting diagram representing the course for the player A.

FIG. 13A is a diagram schematically representing the entirety of the course when the racing game further progresses after FIG. 12, and is a diagram representing the course for the player A. FIG. 13A displays only objects necessary for the description and omits the display of some objects.

After the movement object TOa passes through the right route in the branch portion IC2, the movement object TOa moves forward along the path ((1) to (3) of FIG. 13A). In the second lap, the path is restricted by entry prevention objects 60 in a plurality of branch portions, whereby, as shown in (2) and (3) of FIG. 13A, the movement object TOa moves forward in a direction opposite to that in the first lap. In the second lap, the direction opposite to that in the first lap is the forward direction in the racing game. That is, in the first lap, the counterclockwise direction when viewed from directly above the course is the forward direction in the racing game. In the second lap, however, the clockwise direction when viewed from directly above the course is the forward direction in the racing game. A player inputs the left or right direction of the analog stick while pressing the predetermined button and thereby can turn a movement object TO by 180 degrees and cause the movement object TO to run backward relative to the forward direction. If, however, the movement object TO runs backward, the player is warned to return to the forward direction. If the movement object TO runs backward by a predetermined distance, the moving direction of the movement object TO may be forcibly corrected to the forward direction.

FIG. 13A also shows the position and the moving path of the movement object TOb for reference. The movement object TOb is running the first lap. Thus, as shown in (1) to (3) of FIG. 13A, the movement object TOb moves in the counterclockwise direction when viewed from directly above the course as the forward direction.

As shown in (3) and (4) of FIG. 13A, in the second lap of the movement object TOa, an acceleration object 62 and an item box 63 are displayed in the straight portion. As shown in (4) of FIG. 13A, if the movement object TOa and the movement object TOb reach the straight portion, the movement object TOa and the movement object TOb move in directions opposite to each other (directions in which the movement object TOa and the movement object TOb come close to each other).

Figure 13B:
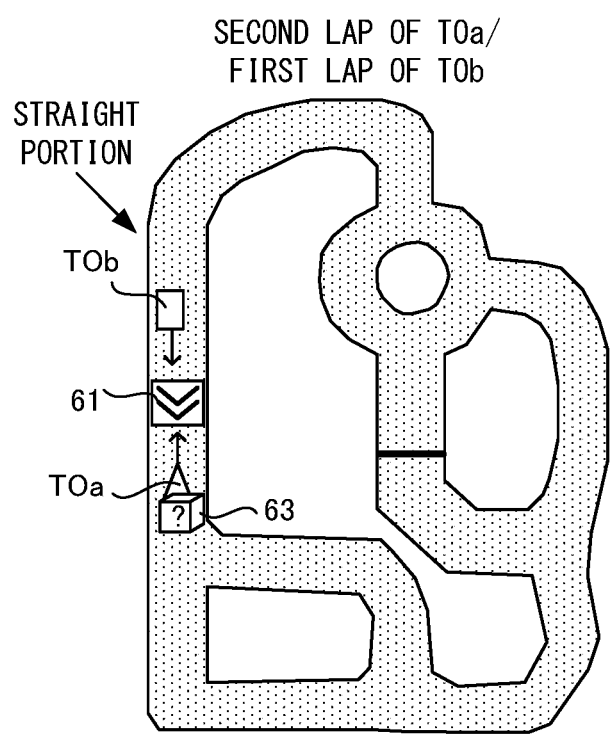
FIG. 13B is an example non-limiting diagram representing a course for the player B at the same time as (4) of FIG. 13A.

FIG. 13B is a diagram representing the course for the player B at the same time as (4) of FIG. 13A. As shown in FIG. 13B, in the first lap of the movement object TOb, an acceleration object 61 and an item box 63 are displayed in the straight portion.

Figure 14:
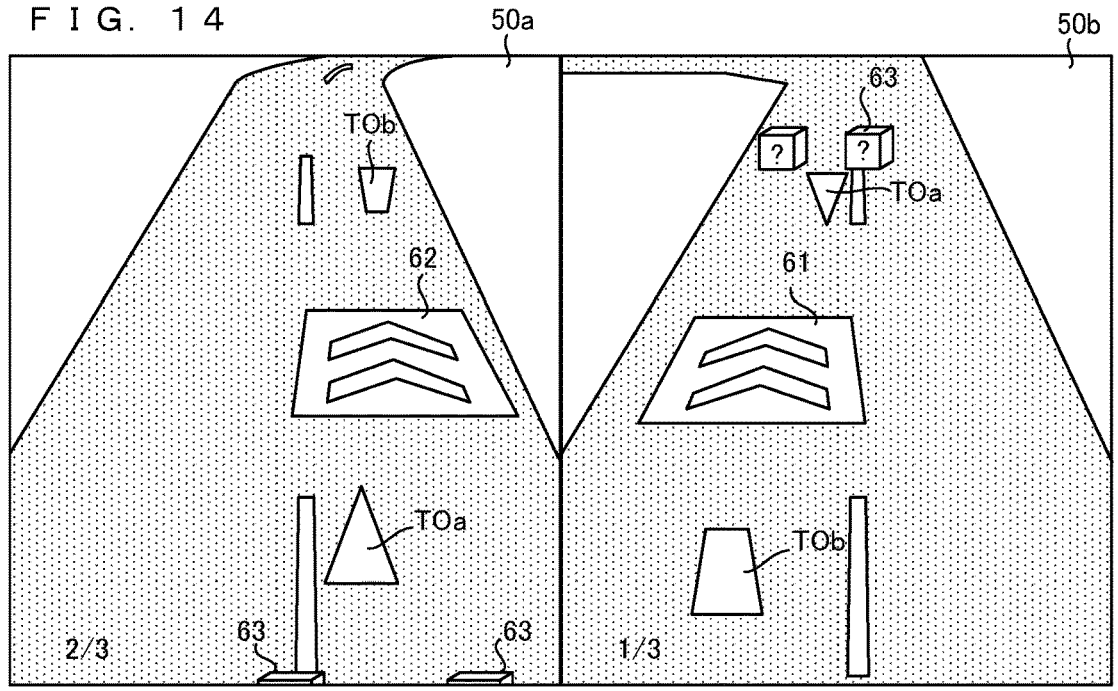
FIG. 14 is an example non-limiting diagram showing an example of a game image displayed on the screen in the state shown in (4) of FIG. 13A and FIG. 13B.

FIG. 14 is a diagram showing an example of a game image displayed on the screen in the state shown in (4) of FIG. 13A and FIG. 13B.

In the game image 50a on the left side of FIG. 14, the acceleration object 62 is displayed. Similarly to the above acceleration object 61, the acceleration object 62 is an object that accelerates a movement object TO in the forward direction. The acceleration object 62 includes an image indicating a direction opposite to that of the acceleration object 61. Specifically, the acceleration object 62 includes an image indicating a direction from bottom to top (a second direction) in (4) of FIG. 13A. Here, the acceleration object 62 is occasionally referred to as "an acceleration object in the second direction". In the game image 50a on the left side of FIG. 14, the acceleration object 62 indicates the depth direction in the game image 50a (the forward direction for the movement object TOa). If the movement object TOa passes over the acceleration object 62, the movement object TOa is accelerated in the forward direction.

On the other hand, in the game image 50b on the right side of FIG. 14, the acceleration object 61 is displayed. The acceleration object 61 includes an image indicating a direction from top to bottom (a first direction) in FIG. 13B. Here, the acceleration object 61 is occasionally referred to as "an acceleration object in the first direction". As shown in the game image 50b, the acceleration object 61 indicates the depth direction in the game image 50b (the forward direction for the movement object TOb). If the movement object TOb passes over the acceleration object 61, the movement object TOb is accelerated in the forward direction.

The acceleration object 61 and the acceleration object 62 indicate the same direction (the depth direction of the screen) based on the forward directions of the movement objects TO and both accelerate the movement objects TO in the forward directions. On the other hand, based on the entirety of the course, the acceleration object 61 and the acceleration object 62 indicate directions opposite to each other and accelerate the movement objects TO in the opposite directions.

The acceleration object 61 and the acceleration object 62 are placed at the same position on the course. That is, the acceleration object 61 and the acceleration object 62 are placed at positions overlapping each other.

As described above, in the first lap, the acceleration object 61 that accelerates a movement object TO in the first direction on the course is placed. In the second lap, on the premise that the movement object TO moves in a direction opposite to that in the first lap as the forward direction, the acceleration object 62 that accelerates the movement object TO in the second direction on the course is placed.

As described above, in the racing game according to the exemplary embodiment, on the premise that a movement object TO takes multiple laps on the course, an entry prevention object 60 is displayed in a branch portion so that the path through which the movement object TO passes differs depending on the number of laps of the movement object TO.

Next, a description is given of an example of a method for causing entry prevention objects and other objects (acceleration objects, item boxes, and the like) to appear on the course.

Figure 15:
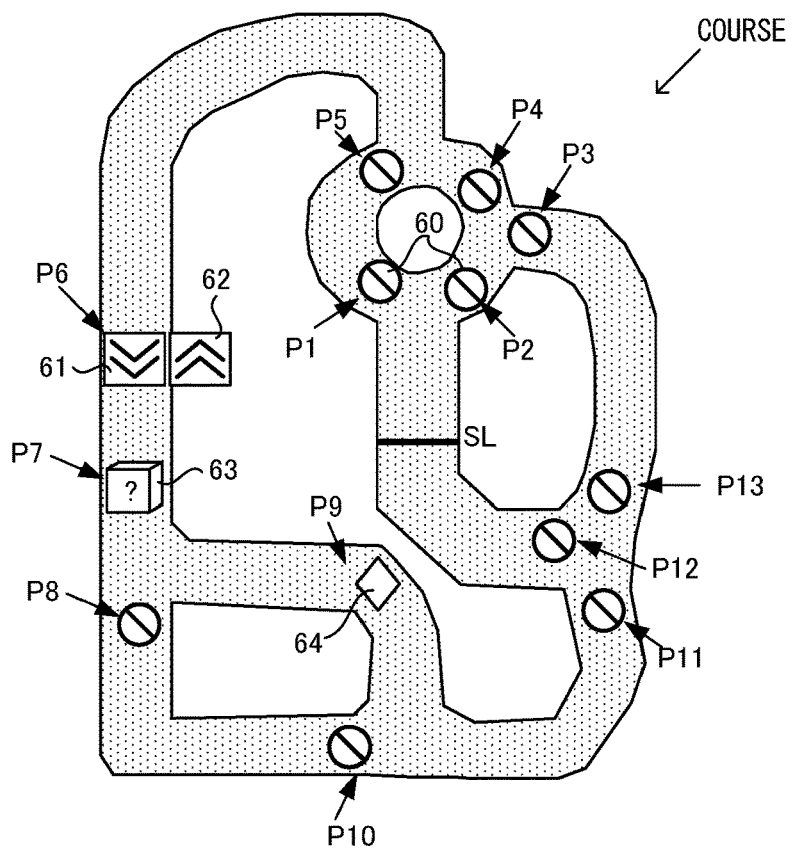
FIG. 15 is an example non-limiting diagram showing an example of the placement of all objects.

FIG. 15 is a diagram showing an example of the placement of all objects. As shown in FIG. 15, all objects are placed in advance on the course. For example, at positions P1 to P5 on the course, entry prevention objects 60 are placed in advance. For example, the position P1 is a position relating to the left route in the branch portion IC1, and the position P2 is a position relating to the right route in the branch portion IC1.

At a position P6, an acceleration object 61 and an acceleration object 62 are placed. In FIG. 15, the acceleration object 61 and the acceleration object 62 seem to be placed at different positions, but actually, are placed to overlap the same position.

At a position P7, an item box 63 is placed. At positions P8 and P10, entry prevention objects 60 are placed. At a position P9, an item 64 is placed. The item 64 is an object that advantageously or disadvantageously affects a movement object TO in the racing game. If the movement object TO collides with the item 64, the movement object TO acquires the item 64.

At positions P11 to P13, entry prevention objects 60 are placed. In addition to these objects, a plurality of objects may be placed in advance on the course.

Each object placed in advance on the course shown in FIG. 15 is enabled or disabled in accordance with the degree of progress of the movement object TO in the racing game. Specifically, a plurality of object sets for enabling each object placed in advance are prepared, and each object is enabled using the object sets.

FIG. 16 is a diagram showing an example of a table where the degree of progress of a movement object and an object set are associated with each other.

The degree of progress of a movement object TO in the racing game is set based on a position along a fixed route on a course for the movement object TO. The starting point (an A point) to the goal point in FIG. 16 is the fixed route. The degree of progress of the movement object TO indicates at which point on the fixed route the movement object TO is present. The degree of progress may be represented by, for example, the distance along the fixed route from the starting line, or may be represented by a coordinate position in the game space. As shown in FIG. 16, in accordance with the degree of progress of the movement object TO, an object set is applied to the movement object TO.

For example, in a section from the starting point (the A point) to a B point, an object set 1-A is applied to the movement object TO, and each object is enabled using the object set. In a section from the B point to a C point, an object set 1-B is applied. In a section from the C point to a D point, an object set 1-C is applied. These points may be lines crossing the road.

In a section from the D point to an E point, an object set 2-D is applied. In the section from the D point to the E point, the starting point is present. In this section, the first lap changes to the second lap. In a section from the E point to an F point, an object set 2-E is applied.

Similarly, the remaining object sets are applied in accordance with in which section shown in FIG. 16 the movement object TO is located. For example, in a section from an H point to an I point, an object set 3-H is applied. In the section from the H point to the I point, the starting point is present. In this section, the second lap changes to the third lap. Each section shown in FIG. 16 is merely an example, and sections may be optionally divided from the starting point to the goal point. For example, the starting point may be located between a certain section and a next section. For example, sections may be divided with respect to each lap, and a different object set may be applied to each lap.

Here, the section from the A point to the B point and the section from the D point to the E point include the same position on the course. With reference to FIGS. 17 and 18, examples of the object set 1-A used in the section from the A point to the B point and the object set 2-D used in the section from the D point to the E point are described below.

FIG. 17 is a diagram showing an example of the object set 1-A. FIG. 18 is a diagram showing an example of the object set 2-D.

An object set is a set of objects set to enabled for a movement object TO. If an object set is not applied, each object is disabled for all movement objects. If an object set is applied to a movement object TO, the objects included in the object set are enabled for the movement object TO. Each object set includes a list of object identifiers identifying the objects to be enabled. For each object identifier, information such as the type, the position, the placement direction (the orientation in the game space), and the scale of the relating object, whether a movement object TO can slip through the relating object, and the like is stored as object placement data described below in a memory (e.g., the DRAM 27 or the external storage medium). In FIGS. 17 to 20, the representation of each object identifier suggests the type and the position of an object. For example, an object identifier "entry prevention object_P3" represents an identifier identifying the entry prevention object placed at the position P3. For example, "acceleration object_P6_first direction" represents an identifier identifying the acceleration object in the first direction placed at the position P6. For example, "acceleration object_P6_second direction" represents an identifier identifying the acceleration object placed in the second direction at the position P6. If an object is enabled for a movement object TO, in a game image relating to the movement object TO, the display of the object is enabled, and a collision determination between the movement object TO and the object is enabled. If, on the other hand, an object is disabled for a movement object TO, in a game image relating to the movement object TO, the object is not displayed, and the collision determination between the movement object TO and the object is not made, either.

As shown in FIG. 17, in the object set 1-A, the entry prevention object 60 placed at the position P3 is enabled. Consequently, in a game image based on a virtual camera set behind a movement object TO (a game image relating to the movement object), only the entry prevention object 60 placed at the position P3 is displayed (caused to appear). The collision determination between the movement object TO and the entry prevention object 60 placed at the position P3 is enabled. The movement object cannot slip through the entry prevention object 60 with which the movement object collides. Thus, as a result, as shown in FIGS. 6 and 8, only the entry prevention object 60 that prevents entry to the right route in the branch portion IC2 is displayed. In the first lap, if the movement object TO moves forward on the right route in the branch portion IC2, the movement object TO collides with the entry prevention object 60 placed at the position P3.

On the other hand, as shown in FIG. 18, in the object set 2-D, the entry prevention objects 60 placed at the positions P1 and P4 are enabled. The entry prevention object 60 at the position P12 is also enabled. Consequently, in a game image relating to the movement object TO, the entry prevention objects 60 placed at the positions P1, P4, and P12 are displayed (caused to appear). The collision determination between the movement object TO and the entry prevention objects 60 placed at the positions P1, P4, and P12 is enabled. As a result, the game image 50*a* on the left side of FIG. 12 is displayed. In the second lap, the movement object TO cannot move forward on the left route in the branch portion IC2, and moves forward on the right route. In the game image 50*a* on the left side of FIG. 12, the entry prevention object 60 at the position P12 is not included in the image capturing range of the virtual camera and therefore is not displayed. The entry prevention object 60 at the position P12, however, is also internally enabled.

The section from the B point to the C point and the section from the E point to the F point include the same position on the course. With reference to FIGS. 19 and 20, examples of the object set 1-B used in the section from the B point to the C point and the object set 2-E used in the section from the E point to the F point are described below.

FIG. 19 is a diagram showing an example of the object set 1-B. FIG. 20 is a diagram showing an example of the object set 2-E.

As shown in FIG. 19, in the object set 1-B, the entry prevention object 60 placed at the position P3 is continuously enabled. The acceleration object 61 in the first direction at the position P6 is enabled, and the item box 63 at the position P7 is enabled. Consequently, in the first lap, the game image 50*a* on the left side of FIG. 10 is displayed. As described above, an object present in a section different from a section where the movement object TO is currently present may also be enabled. Consequently, for example, even in a case where the virtual camera captures a portion beyond the position where the movement object TO is currently present, or the virtual camera captures a position in a direction opposite to the position where the movement object TO is currently present when the movement object TO is directed in a direction opposite to the forward direction, the object can be displayed.

On the other hand, as shown in FIG. 20, in the object set 2-E, the acceleration object 62 in the second direction at the position P6 is enabled. The item box 63 at the position P7 is also enabled. Consequently, in the second lap, the game image 50*a* on the left side of FIG. 14 is displayed. The entry prevention object 60 at the position P8, the item 64 at the position P9, the entry prevention object 60 at the position P10, and the entry prevention object 60 at the position P12 are also enabled.

As described above, different object sets are applied in accordance with the degree of progress of the movement object TO, and each object is enabled, whereby entry prevention objects 60 are displayed at different positions depending on the number of laps of the movement object TO. Consequently, it is possible to make the path of the movement object TO different between an N-th lap and an M-th lap (N and M are different integers) in the racing game. It is also possible to make an object that is displayed (caused to appear) on the course and advantageously or disadvantageously affects the racing game different between the N-th lap and the M-th lap.

Figure 21:
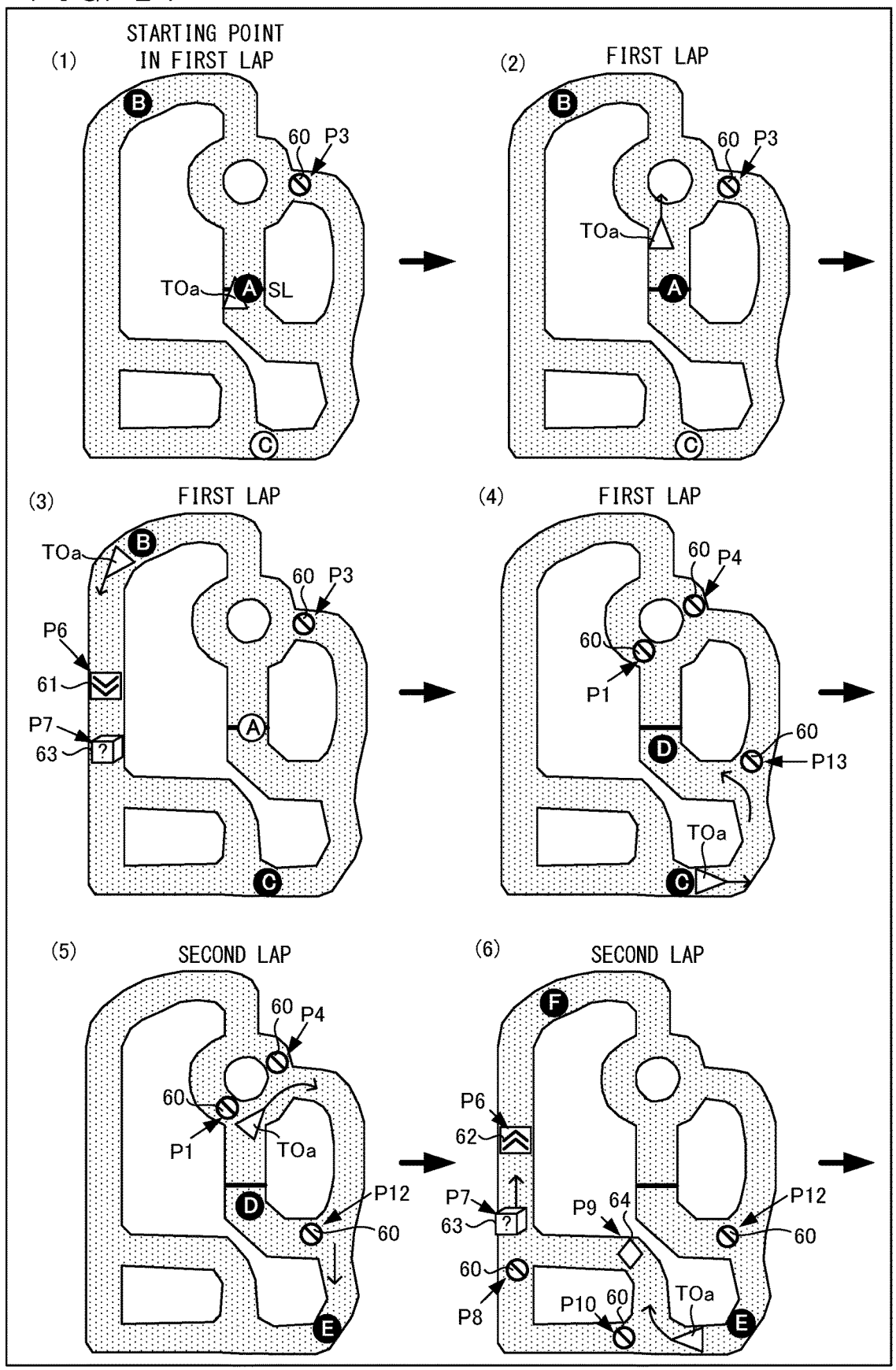
FIG. 21 is an example non-limiting diagram representing each object enabled based on the object sets shown in FIG. 16, and is an example non-limiting diagram showing an example of each object displayed when the movement object TOa moves forward from the first lap to the second lap.

FIG. 21 is a diagram representing each object enabled based on the object sets shown in FIG. 16, and is a diagram showing an example of each object displayed when the movement object TOa moves forward from the first lap to the second lap.

In FIG. 21, a circular icon represents each point, and a character representing the point is displayed in the circle. Icons at both ends of a section where the movement object TOa is present are blacked out.

When the movement object TOa is present in the section from the starting point (the A point) to the B point, the object set 1-A is applied. Consequently, the entry prevention object 60 at the position P3 is enabled, and the movement object TOa cannot pass through the right route in the branch portion IC2 ((1) and (2) of FIG. 21). If the movement object TOa moves and enters the section from the B point to the C point, the object set 1-B is applied. Using the object set 1-B, the entry prevention object 60 at the position P3, the acceleration object 61 in the first direction at the position P6, and the item box 63 at the position P7 are enabled ((3) of FIG. 21).

If the movement object TOa further moves and enters the section from the C point to the D point, the object set 1-C is applied, and the entry prevention object 60 at the position P13, the entry prevention object 60 at the position P1, and the entry prevention object 60 at the position P4 are enabled ((4) of FIG. 21). In this case, the movement object TOa moves forward in a direction toward the starting point, passes through the D point, and enters the second lap.

In the section from the D point to the E point, the object set 2-D is applied, the entry prevention objects 60 at the positions P1 and P4 are continuously enabled, and the entry prevention object 60 at the position P12 is also enabled ((5) of FIG. 21). Consequently, the movement object TOa moves forward in a direction (clockwise) opposite to that in the first lap on the course. This is the forward direction for the movement object TOa in the second lap.

If the movement object TOa further moves and enters the section from the E point to the F point, the object set 2-E is applied. In this section, the entry prevention object 60 at the position P12 is continuously enabled, and the entry prevention objects 60 at the positions P8 and P10 are also enabled. The item 64 at the position P9, the item box 63 at the position P7, and the acceleration object 62 in the second direction at the position P6 are also enabled ((6) of FIG. 21).

From this point onward, similarly, an object set is applied in accordance with the degree of progress of the movement object TOa. If the movement object TOa takes three laps around the course, the movement object TOa reaches the goal. If all the movement objects TO reach the goal, the racing game ends.

As described above, the course is divided into sections, and an object is enabled with respect to each section. Here, each object may be enabled after a movement object TO passes through a starting point and until the movement object TO reaches a next starting point (including both starting points). A "starting point" as used herein refers to the position where the movement object TO is at rest on the near side of the starting line before the start of the race in the first lap, and refers to the starting line after the second and subsequent laps. For example, after the movement object TO passes through a starting point in the second lap and until the movement object TO reaches a starting point in the third lap, objects are enabled. In the second lap, the enabled objects appear. For example, in FIG. 21, from the start of the first lap to the start of the second lap, the entry prevention object 60 at the position P3 is enabled ((1) of FIG. 21), and the entry prevention object 60 at the position P13 is enabled ((4) of FIG. 21). That is, while the movement object TO takes one lap around the course, objects are enabled.

After a movement object passes through a branch portion in the current lap and before the movement object enters the next lap, at least some of the entry prevention objects 60 for the next lap are enabled (paths are switched). For example, in (5) of FIG. 21, after the movement object TOa passes through the branch portions IC1 and IC2 and before the movement object TOa enters the second lap, the entry prevention objects 60 at the positions P1 and P4 are enabled ((4) of FIG. 21) to set the path in the branch portions IC1 and IC2 in the second lap.

Specifically, before a branch portion enters the image capturing range of a virtual camera, an entry prevention object 60 in the branch portion is enabled. That is, before the branch portion can be viewed, the entry prevention object 60 is enabled in the branch portion. Thus, the moment that the state where the entry prevention object 60 is disabled changes to the state where the entry prevention object 60 is enabled is not displayed. The timing when the entry prevention object 60 is disabled may be set so that the moment that the state where the entry prevention object 60 is enabled changes to the state where the entry prevention object 60 is disabled is not included in the image capturing range of the camera, either. For example, in (1) of FIG. 21, the movement object TOa is at the starting point, and the position P3 is not included in the image capturing range of the virtual camera VCa relating to the movement object TOa. Thus, at this time, the position P3 is not displayed in the game image 50*a*, but the entry prevention object 60 at the position P3 is enabled. Also other objects other than the entry prevention object 60 are enabled before the other objects can be viewed. For example, as shown in (3) of FIG. 21, before the movement object TOa approaches the straight portion (i.e., before the position P6 and the position P7 can be viewed), the acceleration object 61 at the position P6 and the item box 63 at the position P7 are enabled.

As described above, an entry prevention object 60 is enabled in advance in a branch portion, whereby it is possible to switch paths even in a case where a movement object TO moves at high speed. Before a virtual camera captures the position where an object is placed, the object is enabled or disabled. For example, before a branch portion is viewed, an entry prevention object 60 is enabled in the branch portion. Consequently, it is possible to prevent the entry prevention object 60 from suddenly appearing in a game image. Thus, it is possible to switch paths without giving discomfort to a player.

As described above, in the racing game according to the exemplary embodiment, in a branch portion on the course, entry to a branch destination is restricted or allowed in accordance with the degree of progress of a movement object TO, thereby switching the path of the movement object TO. Consequently, for example, the movement object TO moves forward along a different path in each lap. Thus, it is possible to improve the interest of the racing game.

(Details of Game Processing)

Next, with reference to FIGS. 22 to 25, the details of the game processing performed by the game system 1 are described.

FIG. 22 is a diagram showing examples of various pieces of data used in the game processing performed by the game system 1. As shown in FIG. 22, the game system 1 stores a game program, movement object data, course data, object placement data, and object set data.

Figure 23:
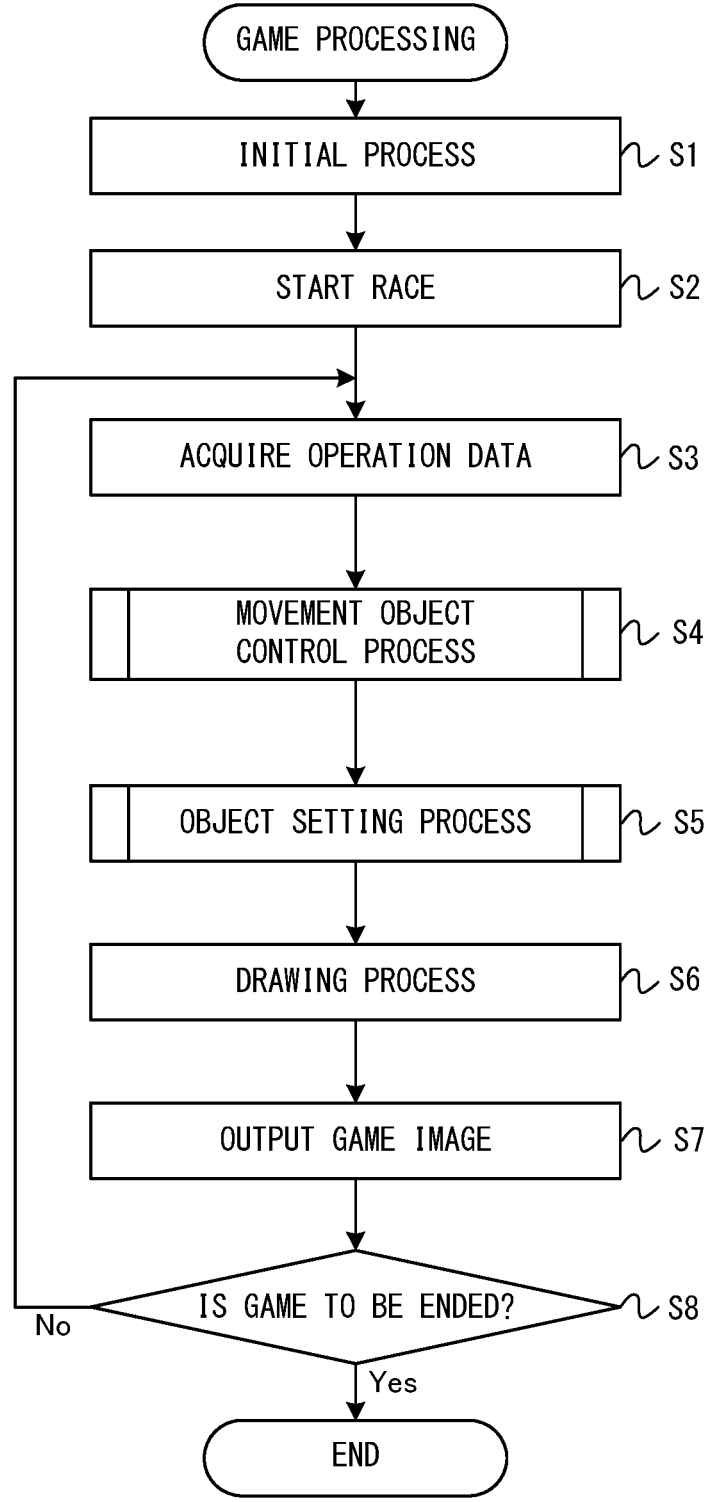
FIG. 23 is an example non-limiting flow chart showing an example of the game processing executed by the game system 1.

The game program is a program for executing the game processing according to the exemplary embodiment (game processing shown in FIG. 23). The game program is stored in advance in the storage medium attached to the slot 29 or the flash memory 26 and is loaded into the DRAM 27 when the racing game is executed.

The movement object data includes data regarding each movement object. For example, the movement object data includes data regarding the movement object TOa controlled by the player A, data regarding the movement object TOb controlled by the player B, and data regarding the movement object TOc controlled by the processor 21. The data regarding each movement object includes data indicating the shape of each movement object, data regarding an item acquired by each movement object, data indicating the number of laps and the position of each movement object, data indicating the moving direction and the moving velocity of each movement object, and data regarding the state (e.g., an advantageous or disadvantageous state) of each movement object. The data regarding each movement object includes information indicating an object set applied to the movement object. For example, if the movement object TOa is located in the section from the E point to the F point, the data regarding the movement object TOa includes information indicating the currently applied object set 2-E. If the movement object TOb is located in the section from the B point to the C point, the data regarding the movement object TOb includes information indicating the currently applied object set 1-B.

The course data is data for defining a course where the racing game is performed. The course data includes course objects defining the course (a road, a wall, and the like). In the exemplary embodiment, a plurality of courses are prepared in advance, and the course data relating to each course is stored in the game system 1. The course data may be stored in advance in the storage medium attached to the slot 29 or the flash memory 26, or may be acquired from a server via the Internet, or may be acquired from another main body apparatus 2.

The object placement data is data regarding the placement of each object. The object placement data includes data indicating a position on the course and data regarding an object placed at the position. The data regarding the object includes data indicating the shape and the external appearance of the object, data indicating the type of the object, data indicating the state of the object (e.g., whether or not the object is acquired), and the like.

The object set data is data for enabling each object placed on the course, and for example, is the data shown in FIGS. 17 to 20.

The game system 1 stores various pieces of data in addition to the data shown in FIG. 22. For example, the game system 1 stores data indicating the correspondence table shown in FIG. 16, data regarding an item, and the like.

FIG. 23 is a flow chart showing an example of the game processing executed by the game system 1. The game processing shown in FIG. 23 is started, for example, in accordance with the fact that a player gives an instruction to start the game.

In the exemplary embodiment, the description is given on the assumption that the processes of steps shown in FIG. 23 are executed using a memory (e.g., the DRAM 27) by the processor 21 of the main body apparatus 2 executing the game program. In another exemplary embodiment, however, some of the processes of the following steps may be executed by a processor (e.g., a dedicated circuit or the like) different from the processor 21. Further, in a case where the game system 1 can communicate with another information processing apparatus (e.g., a server), some of the processes of the steps shown in FIG. 23 may be executed by the other information processing apparatus. The processes of all of the steps shown in FIG. 23 are merely illustrative. Thus, the processing order of the steps may be changed, or another process may be performed in addition to (or instead of) the processes of all of the steps, so long as similar results are obtained.

As shown in FIG. 23, in step S1, the processor 21 executes an initial process. Specifically, the processor 21 loads the course data from the external storage medium attached to the slot 29 or the flash memory 26 and sets a three-dimensional game space including a course where the racing game is performed. The processor 21 also places one or more movement objects TO controlled by players and one or more movement objects TO controlled by the processor 21 on a starting line on the course. The processor 21 also places each object at a position set in advance on the course.

In step S2, the processor 21 starts the racing game. After the racing game is started in step S2, the processes of steps S3 to S8 are repeatedly executed at predetermined frame time intervals (e.g., 1/60-second intervals) during the racing game.

In step S3, the processor 21 acquires the operation data from the controllers. Here, the main body apparatus 2 acquires the operation data from the controller 3 operated by the player A and the operation data from the controller 4 operated by the player B.

Figure 24:
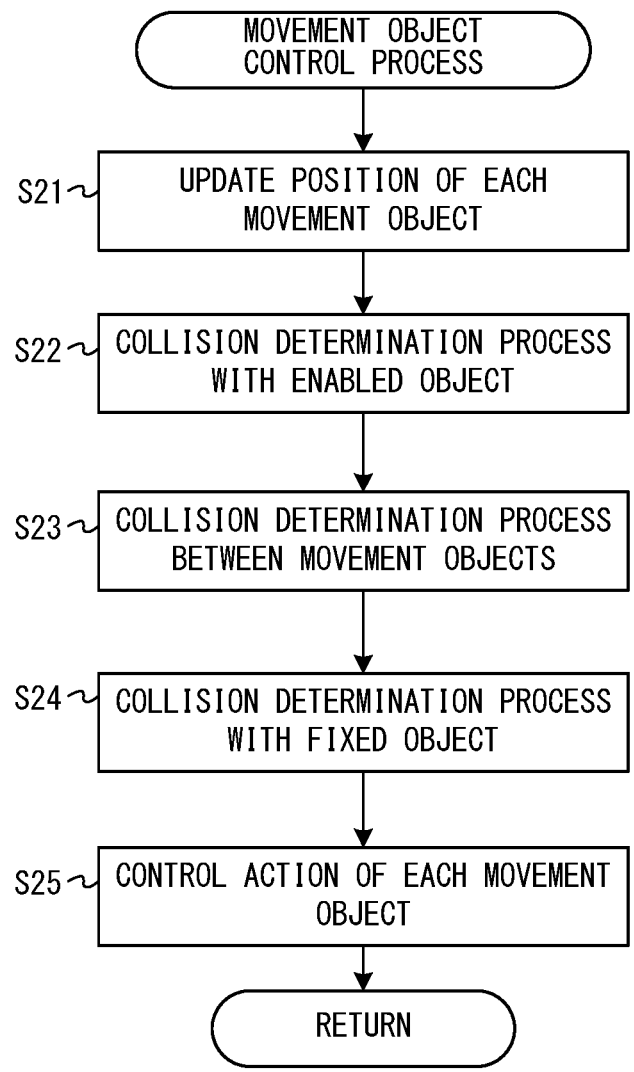
FIG. 24 is an example non-limiting flow chart showing an example of a movement object control process in step S4.

In step S4, the processor 21 performs a movement object control process. The movement object control process is the process of moving each movement object TO, making a collision determination regarding each movement object TO, and causing each movement object TO to perform an action. With reference to FIG. 24, the details of the movement object control process in step S4 are described below.

FIG. 24 is a flow chart showing an example of the movement object control process in step S4.

In step S21, the processor 21 updates the position of each movement object TO. Specifically, based on the operation data from the controller 3 acquired in step S3, the processor 21 moves the movement object TOa relating to the player A along the course. Based on the operation data from the controller 4 acquired in step S3, the processor 21 also moves the movement object TOb relating to the player B along the course. The processor 21 also moves the movement object TOc controlled by the processor 21 along the course. If a movement object TO moves over the starting line SL by moving the movement object TO, "1" is added to the number of laps of the movement object TO, and number-of-laps display is updated. The processor 21 executes the process of step S22 next.

In step S22, the processor 21 performs a collision determination process between each movement object TO and an enabled object. Here, based on the position and the shape of each movement object TO, it is determined whether or not each movement object TO collides with an object enabled in step S5 described below. If it is determined that the movement object TO collides with an enabled object, the processor 21 executes a process relating to the collision. The collision determination between a disabled object and a movement object TO is not made. For example, the processor 21 determines whether or not the movement object TOa collides with an enabled object. If it is determined that the movement object TOa collides with an enabled object, the processor 21 performs a process relating to the object with which the movement object TOa collides. Only an object enabled for the movement object TOa affects the movement object TOa, and an object disabled for the movement object TOa does not affect the movement object TOa. For example, even in the case of an object enabled for the movement object TOb, if the object is disabled for the movement object TOa, the object does not affect the movement object TOa.

For example, based on an object set set in accordance with the degree of progress of the movement object TOa, if the entry prevention object 60 at the position P1 is enabled, the processor 21 makes the collision determination between the movement object TOa and the entry prevention object 60 at the position P1. If the movement object TOa collides with the entry prevention object 60 at the position P1, the processor 21 stops or decelerates the movement object TOa or changes the moving direction of the movement object TOa. If the entry prevention object 60 at the position P1 is disabled, and even if the movement object TOa reaches the position P1, the collision determination between the movement object TOa and the entry prevention object 60 at the position P1 is not made. That is, if the entry prevention object 60 at the position P1 is disabled, the entry prevention object 60 is not present at the position P1 for the movement object TOa, and the movement object TOa passes through the position P1.

If the acceleration object 61 in the first direction at the position P6 is enabled, the processor 21 makes the collision determination between the movement object TOa and the acceleration object 61 and performs a process relating to the result of the collision determination. For example, when the movement object TOa is moving in the first direction (the forward direction) in the game space, and if the movement object TOa collides with the acceleration object 61, the movement object TOa is accelerated in the first direction in the game space.

If the item box 63 at the position P7 is enabled, the processor 21 makes the collision determination between the movement object TOa and the item box 63 and performs a process relating to the result of the collision determination. For example, if the movement object TOa collides with the item box 63, the movement object TOa acquires the item box 63 and acquires a predetermined item. For example, if the movement object TOa collides with the item box 63, any item may be randomly selected from among a plurality of items, and the selected item may be acquired by the movement object TOa. If the movement object TOa acquires the item box 63, the acquired item box 63 enters the state where the item box 63 cannot be viewed from or acquired by another movement object. For example, in a case where five item boxes 63 are present at the position P7, and if one of the item boxes 63 is acquired by the movement object TOa, the acquired item box 63 is apparently erased, and four item boxes 63 remain at the position P7. That is, the acquired item box 63 enters the state where the item box 63 cannot be viewed or acquired. Thus, even if another subsequent movement object TO (e.g., TOb or TOc) reaches the position P7, the four item boxes 63 are displayed at the position P7, and only any of the four item boxes 63 can be acquired. That is, if the item box 63 at the position P7 is enabled for a plurality of movement objects TO, the state of the item box 63 is common to the plurality of movement objects TO. Thus, if any movement object TO changes the state of the item box 63, the item box 63 is in the same state also for another movement object TO.

The item 64 at the position P9 is also controlled similarly to the item box 63. However, while the item box 63 includes a plurality of item boxes, the item 64 is a single item. At this time, if the item 64 is acquired by the movement object TOa, the acquired item 64 enters the state where the item 64 cannot be viewed or acquired. Thus, even if another subsequent movement object TO (e.g., TOb or TOc) reaches the position P9, the item 64 seems not to be present at the position P9. That is, even though the item 64 at the position P9 is enabled for the plurality of subsequent movement objects TO, the item 64 behaves as if the item 64 were disabled.

In step S22, the processor 21 performs the above collision determination process on all the movement objects TO. That is, the processor 21 performs the collision determination process between the movement object TOb and an item enabled for the movement object TOb. The processor 21 also performs the collision determination process between the movement object TOc and an item enabled for the movement object TOc. The processor 21 executes the process of step S23 next.

In step S23, the processor 21 performs the collision determination process between movement objects. Here, based on the positions and the shapes of movement objects TO, the collision determination between the movement objects TO is made. Here, if a movement object TO attacks another movement object TO (e.g., makes the attack of throwing an item), the collision determination between the attack and the movement object TO is also made. In accordance with the result of the collision determinations, the processor 21 decelerates or stops the movement objects TO or changes the moving directions of the movement objects TO. The processor 21 executes the process of step S24 next.

In step S24, the processor 21 makes the collision determination between an object fixed in the game space (e.g., a wall object along the course or the like) and a movement object TO. In accordance with the result of the collision determination, the processor 21 decelerates or stops the movement object TO or changes the moving direction of the movement object TO. Instead of dividing the collision determination process as in steps S22 to S24, the collision determination process between each movement object and objects other than the movement object may be collectively executed. The processor 21 executes the process of step S25 next.

In step S25, the processor 21 controls the action of each movement object TO. A movement object TO can also perform various actions (a jump, an attack on another movement object TO, the use of an item, and the like) in addition to a movement. The processor 21 causes the movement object TOa to perform an action relating to the operation data from the controller 3. The processor 21 also causes the movement object TOb to perform an action relating to the operation data from the controller 4. The processor 21 also controls the action of the movement object TOc. After the process of step S25, the processor 21 executes the process of step S5 in FIG. 23.

Figure 25:
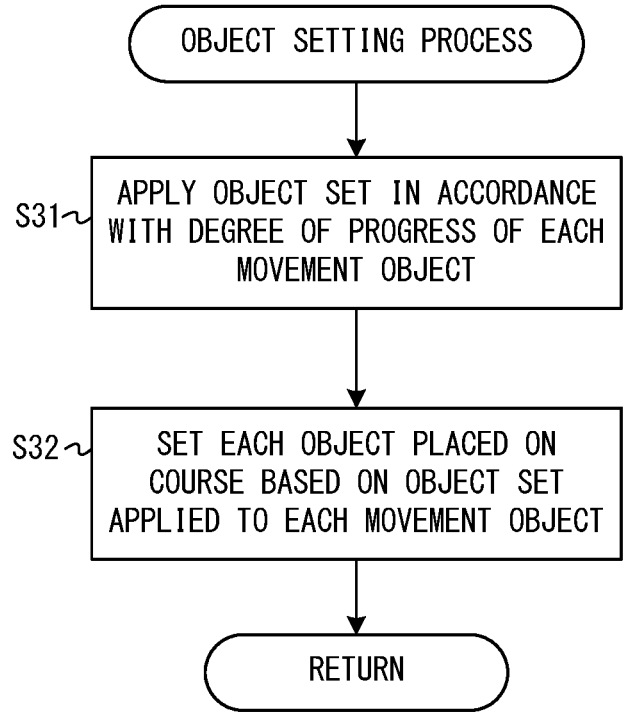
FIG. 25 is an example non-limiting flow chart showing an example of an object setting process in step S5.

Referring back to FIG. 23, in step S5, the processor 21 executes an object setting process. The object setting process is the process of enabling each object placed on the course, using the correspondence table in FIG. 16 and the object sets exemplified in FIGS. 17 to 20. With reference to FIG. 25, the details of the object setting process in step S5 are described below. FIG. 25 is a flow chart showing an example of the object setting process in step S5.

In step S31, in accordance with the degree of progress of each movement object TO, the processor 21 applies an object set to each movement object TO. Here, an object set is applied to each movement object TO using the correspondence table shown in FIG. 16. For example, if the movement object TOa is located in the section from the D point to the E point, the object set 2-D is applied to the movement object TOa. For example, if the movement object TOb is located in the section from the B point to the C point, the object set 1-B is applied to the movement object TOb. For example, if the movement object TOc is located in the section from the F point to the G point, the object set 2-F is applied to the movement object TOc. The processor 21 executes the process of step S32 next.

In step S32, based on the object set applied to each movement object TO, the processor 21 enables each object placed in advance on the course. Consequently, the entry prevention objects 60 placed in advance on the course are enabled, and the acceleration objects 61 and 62, the item box 63, the item 64, and the like are enabled. The object set is applied to each movement object TO, whereby each object placed on the course with respect to each movement object TO is enabled. After the process of step S32, the processor 21 executes the process of step S6 in FIG. 23.

Referring back to FIG. 23, in step S6, the processor 21 executes a drawing process. In the drawing process, a game image is generated based on virtual cameras. For example, the game image 50a is generated based on the virtual camera VCa relating to the movement object TOa. When the game image 50a is generated, the objects enabled for the movement object TOa in step S5 are drawn, whereas the objects disabled for the movement object TOa are not drawn. That is, in the game image 50a, the display of the objects enabled for the movement object TOa is enabled, but the display of the objects disabled for the movement object TOa is disabled. The game image 50b is generated based on the virtual camera VCb relating to the movement object TOb. When the game image 50b is generated, the objects enabled for the movement object TOb in step S5 are drawn, whereas the objects disabled for the movement object TOb are not drawn. Then, the processor 21 generates a game image including the two game images 50a and 50b.

Even in the case of an object of which the display is disabled for a certain movement object TO, the collision determination between the object and another movement object TO may be made in the above step S22. Conversely, even in the case of an object of which the display is enabled for a certain movement object TO, the collision determination between the object and another movement object TO may not be made in the above step S22. For example, in a situation as shown in FIG. 12, in the game image 50a, the entry prevention objects 60 are displayed on the left routes in the branch portions IC1 and IC2. In the game image 50b, however, the entry prevention objects 60 are not displayed, and the movement object TOb can pass through the left route in the branch portion IC1. Thus, if the movement object TOb passes through the left route in the branch portion IC1, in the game image 50a, the movement object TOb seems to move by slipping through the entry prevention object 60. In a situation as shown in FIG. 12, if the movement object TOa moves toward the left route in the branch portion IC1, the movement object TOa collides with the entry prevention object 60 and stops or decelerates. At this time, in the game image 50b, the entry prevention object 60 is not displayed on the left route in the branch portion IC1, but the movement object TOa stops or decelerates. The processor 21 executes the process of step S7 next.

In step S7, the processor 21 outputs the game image generated in step S6 to a display device. The processor 21 executes the process of step S8 next.

In step S8, the processor 21 determines whether or not to end the racing game. For example, if all the movement objects TO reach the goal, or a predetermined time elapses from the start of the racing game, the processor 21 determines that the racing game is to be ended. If the result of the determination in step S8 is negative, the process of step S3 is executed again. From this point onward, the series of processes of steps S3 to S8 is repeatedly executed until it is determined in step S8 that the game is to be ended. If, on the other hand, the result of the determination in step S8 is affirmative, the processor 21 ends the game processing shown in FIG. 23.

The processes shown in the above flow chart are merely illustrative, and the order and the contents of the processes, and the like may be appropriately changed.

As described above, in the exemplary embodiment, an entry prevention object 60 that restricts the entry of a first movement object is enabled in accordance with the degree of progress of the first movement object, regardless of the degree of progress of a movement object other than the first movement object. An entry prevention object 60 that restricts the entry of a second movement object is enabled in accordance with the degree of progress of the second movement object, regardless of the degree of progress of a movement object other than the second movement object. Consequently, it is possible to move each movement object on a different path in accordance with the degree of progress of the movement object, and it is possible to achieve a racing game including a variety of paths on a single course. The path through which a movement object of a player passes is determined in accordance with the degree of progress of the player, and is not affected by the degree of progress of another player. Thus, for example, even if a player is a lap behind another player, the path through which the player can pass does not change in accordance with the progress of the other player. Thus, the player can perform the racing game while moving forward on a variety of paths at the player's pace.

In the exemplary embodiment, a single game space is common to a plurality of movement objects, and objects (an entry prevention object 60, an acceleration object, and the like) are placed in advance on a course in the game space. In accordance with the degree of progress of each movement object in the game, the display of and the collision determination between the objects placed in advance are enabled. Consequently, it is not necessary to construct a game space with respect to each movement object and place objects in each game space. Thus, it is possible to reduce resources and reduce the processing load. For example, a first game space for a first movement object and a second game space for a second movement object are constructed, an entry prevention object 60 is placed in the first game space, and an entry prevention object 60 is not placed in the second game space, whereby it is also possible to enable the entry prevention object 60 for the first movement object and also disable the entry prevention object 60 for the second movement object in the same branch portion on the same course. In this case, however, it is necessary to construct a game space with respect to each movement object, and the processing load may increase. In the exemplary embodiment, however, an entry prevention object 60 is placed in advance in a single game space, and a plurality of movement objects are moved in the same game space, while the enabling and disabling of the display of and the collision determination with the entry prevention object 60 are switched with respect to each movement object. Consequently, it is possible to cause the entry prevention object 60 to appear or not to appear in accordance with the degree of progress of each movement object while reducing the processing load.

In the exemplary embodiment, an entry prevention object 60 is displayed so that the game space in the far direction can be viewed. Consequently, even if another movement object different in the degree of progress in the game slips through the entry prevention object 60, it is possible to reduce discomfort. Even if a movement object cannot enter the game space beyond the entry prevention object 60 due to the entry prevention object 60, the player can view the game space beyond the entry prevention object 60, and for example, can recognize the path when the movement object passes through a branch portion next.

In the exemplary embodiment, before a branch portion can be viewed, an entry prevention object 60 is enabled in the branch portion. Consequently, it is possible to prevent the entry prevention object 60 from suddenly appearing in the branch portion, and it is possible to prevent paths in the branch portion from switching while the branch portion is displayed.

In the exemplary embodiment, a racing game where a movement object takes multiple laps around a course is performed, and a forward direction (a regular moving direction) differs depending on the number of laps of the movement object. For example, in the first lap, a counterclockwise direction when viewed from directly above the course is the regular moving direction, whereas in the second lap, a clockwise direction is the regular moving direction. Thus, for example, if a first movement object is a lap behind a second movement object, the first movement object progresses in a direction opposite to that of the second movement object. Even if the first movement object progresses in the opposite direction, this is the regular moving direction, and therefore, the first movement object can continue to progress in the opposite direction. Consequently, it is possible to achieve a non-conventional racing game having variations.

In the above description, the game processing has been described on the premise that the racing game is performed by two players using a single main body apparatus 2. However, also in a case where the racing game is performed in the single play mode, similar game processing is performed. In this case, the racing game is performed by a movement object (an operation target object) controlled by a player and one or more movement objects controlled by the processor 21. In the above object setting process, an object set shown in FIG. 16 is applied in accordance with the degree of progress of the operation target object, and each object is enabled or disabled. Also regarding the one or more movement objects controlled by the processor 21, an object set shown in FIG. 16 is applied in accordance with the degree of progress of each movement object, and each object is enabled or disabled. In a case where the racing game is performed in the single play mode, the operation target object may be displayed on a first screen, and the movement objects controlled by the processor 21 may be displayed on a second screen.

Also in a case where the racing game is performed in the local communication multiplay mode or the online multiplay mode, game processing similar to the above is performed. For example, in the online multiplay mode, a plurality of main body apparatuses 2 are connected to the Internet and communicate with each other, for example, via a server. For example, a first main body apparatus 2 of a first player and a second main body apparatus 2 of a second player are connected to each other via the Internet, and the racing game is performed in the same game space using a plurality of movement objects including a first movement object relating to the first player and a second movement object relating to the second player. The first main body apparatus 2 controls the first movement object based on operation data from the controllers. The first main body apparatus 2 transmits position information regarding (the number of laps and the position of) the first movement object to the second main body apparatus 2 via the server and also receives position information regarding the second movement object operated by the second player from the second main body apparatus 2 via the server. In the first main body apparatus 2, in the above object setting process, an object set shown in FIG. 16 is applied in accordance with the degree of progress of the first movement object, and a branch destination that the first movement object is allowed to enter or a branch destination that the first movement object is restricted from entering is switched in accordance with the degree of progress of the first movement object. In the second main body apparatus 2, in the above object setting process, an object set shown in FIG. 16 is applied in accordance with the degree of progress of the second movement object, and a branch destination that the second movement object is allowed to enter or a branch destination that the second movement object is restricted from entering is switched in accordance with the degree of progress of the second movement object. In the above movement object control process, the first main body apparatus 2 performs the collision determination process between each movement object (the first movement object and the second movement object) and an enabled object. In the above movement object control process, the second main body apparatus 2 also performs the collision determination process between each movement object (the first movement object and the second movement object) and an enabled object. As described above, also in a case where the racing game is performed in the online multiplay mode, each main body apparatus 2 performs processing similar to the above.

Variations

While the exemplary embodiment has been described above, the exemplary embodiment is merely an example and may be modified as follows, for example.

For example, in the above exemplary embodiment, an entry prevention object that restricts entry to at least one branch destination among a plurality of branch destinations in a branch portion is enabled, thereby restricting a movement object TO from entering the branch destination. In another exemplary embodiment, an entry allowance object that allows entry to at least one branch destination among a plurality of branch destinations in a branch portion may be enabled, thereby allowing a movement object TO to enter the branch destination. For example, the entry allowance object may be a bridge.

That is, an entry control object that restricts entry to at least one branch destination among a plurality of branch destinations in a branch portion or allows entry to at least one branch destination among the branch destinations may be enabled, thereby restricting a movement object TO from entering the branch destination or allowing the movement object TO to enter the branch destination.

The entry control object may be the above entry prevention object, or may be the entry allowance object. The entry control object may switch the path of a movement object taking into account also another parameter in addition to the degree of progress of the movement object. For example, a path switching object may be able to switch to a first or second branch destination among three branch destinations in accordance with the degree of progress, may switch to the first branch destination in a case where a moving body is in a first orientation, and may switch to the second branch destination in a case where the moving body is in a second orientation. The entry control object may be a moving direction change object that forcibly changes the moving direction of a movement object. For example, if a movement object comes close to or collides with the moving direction change object, the moving direction of the movement object may be changed in accordance with the moving direction change object.

The entry control object may be a prompt object that prompts entry to at least one branch destination among a plurality of branch destinations and does not prompt entry to any of the other branch destinations. In accordance with the degree of progress of a movement object in the racing game, the prompt object may be enabled in a branch portion. For example, a movement object is recommended to enter a branch destination that the prompt object prompts the movement object to enter, but may also be able to enter even a branch destination that the prompt object does not prompt the movement object to enter. In this case, the movement object may be able to enter the branch destination but come off the fixed route, and therefore, the degree of progress may not change. Even in a case where such an object is enabled, it is possible to switch paths in accordance with the degree of progress in the racing game, and it is possible to provide a racing game having variations.

In the above exemplary embodiment, objects (an entry prevention object, an acceleration object, an item box, and the like) are placed in advance in the game space, and in accordance with the degree of progress of a movement object in the racing game, the display of the objects is enabled, and the collision determination on the objects is enabled. In another exemplary embodiment, only the display of the objects may be enabled, or only the collision determination on the objects may be enabled.

In the above exemplary embodiment, each object is disabled by default, and in accordance with the degree of progress, an object set is applied, and an object included in the object set is enabled. In another exemplary embodiment, each object may be enabled by default, and in accordance with the degree of progress, each object may be disabled. For example, in accordance with the degree of progress of a movement object, the enabling and disabling of the entry control object may be switched, thereby switching the path of the movement object.

In the above exemplary embodiment, objects (an entry prevention object, an acceleration object, an item box, and the like) are placed in advance in the game space, and in accordance with the degree of progress of a movement object in the racing game, the placed objects are enabled. Consequently, for example, the entry prevention object restricts the entry of the movement object, or the movement object is allowed to acquire the item box. In another exemplary embodiment, objects are not placed in advance in the game space, and in accordance with the degree of progress of a movement object in the racing game, objects may be placed in the game space, thereby enabling the objects. That is, the enabling of objects includes the enabling of the display of and/or the collision determination on objects placed in advance, and the new placement of objects in the game space.

Not only by a method for enabling the above entry control object, but also by another method, a branch destination that the movement object is restricted from entering or a branch destination that the movement object is allowed to enter may be switched in a branch portion in accordance with the degree of progress of the movement object. For example, a movement object may be automatically controlled to enter different branch destinations in a branch portion in accordance with the degree of progress without depending on the entry control object.

In the above exemplary embodiment, an acceleration object is an object that accelerates the velocity in the same direction as the forward direction. In another exemplary embodiment, in addition to or instead of the acceleration object, a movement change object that changes the movement form in a predetermined direction may be placed. For example, the movement change object may be an object that causes a movement object to jump in the same direction as the forward direction. In another example, the acceleration object may be an object that accelerates a movement object in the direction in which the movement object currently progresses, regardless of the moving direction of the movement object when the movement object collides with the acceleration object. In this case, among a plurality of acceleration objects that have the same function of accelerating the movement object but are different in the direction of an arrow to be displayed, an acceleration object of which the direction of the arrow is along the forward direction may be enabled in accordance with the degree of progress. The acceleration object may have display indicating the direction, but may accelerate a movement object in the forward direction in accordance with the degree of progress, regardless of the display. The acceleration object may not have display indicating the direction, and may accelerate a movement object in the forward direction in accordance with the degree of progress.

The degree of progress of a movement object in the racing game may be set based on the number of laps and the position of the movement object, or may be set based only on the number of laps of the movement object, or may be set in accordance with the moving distance along a course for the movement object.

In the above exemplary embodiment, the racing game where a plurality of movement objects take multiple laps around the entirety of the course is performed. In another exemplary embodiment, in the racing game, a plurality of movement objects may only take one lap around the course, and a branch portion through which the plurality of movement objects pass multiple times may be provided on the course. The racing game may be a game where a plurality of movement objects move forward from a starting point to a goal point different from the starting point, and a branch portion through which the plurality of movement objects pass multiple times may be provided between the starting point and the goal point. In such a case, control may be performed so that the above entry control object is enabled in the branch portion, whereby a movement object enters different branch destinations depending on the number of times the movement object passes through the branch portion.

In the above exemplary embodiment, the racing game is a game where a movement object takes multiple laps around the entirety of the course, and paths are switched by enabling an entry prevention object, and the moving direction (the forward direction) of the movement object differs depending on the number of laps. In another exemplary embodiment, without depending on the switching of paths using the above entry prevention object, on the premise that a common path through which the movement object passes multiple times during the racing game is included, the moving direction (the forward direction) of the movement object on the common path may differ depending on the number of times the movement object passes through the common path. For example, a configuration may be employed in which, when the movement object passes through the common path for an N-th time, a first direction in the game space is the moving direction, and when the movement object passes through the common path for an M-th time, a second direction in the game space is the moving direction. In this case, for example, the above acceleration object accelerates the movement object in a direction relating to the moving direction (the first direction in a case where the first direction is the moving direction, and the second direction in a case where the second direction is the moving direction).

The above processing may be executed not only by the game system 1, but also by any other information processing apparatus or information processing system. The information processing system may include a plurality of apparatuses, and the plurality of apparatuses may be connected to each other via a network (e.g., a LAN, the Internet, or the like).

The configurations of the above exemplary embodiment and its variations can be optionally combined together unless they contradict each other. Further, the above description is merely an example of the exemplary embodiment, and may be improved and modified in various manners other than the above.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program for causing a computer to execute a racing game that progresses by moving a plurality of movement objects in a course defined by a course object in a virtual space, wherein
   the course includes a branch portion branching into a plurality of branch destinations,
   the plurality of movement objects pass through the branch portion multiple times in progressing through the course, and
   the game program causes the computer to:
      move an operation target object as an operation target of a player among the plurality of movement objects on the course based on an operation input provided by the player;
      allow the operation target object to enter at least one branch destination among the plurality of branch destinations and restrict the operation target object from entering any of the other branch destinations in the branch portion; and
      switch a branch destination that the operation target object is allowed to enter or a branch destination that the operation target object is restricted from entering in the branch portion in accordance with a degree of progress of the operation target object in the racing game, regardless of degrees of progress of the movement objects other than the operation target object in the racing game.

2. The non-transitory computer-readable storage medium having stored therein the game program according to claim 1, wherein
   the game program causes the computer to switch enabling and disabling of an entry control object that restricts entry to any of the other branch destinations or allows entry to the at least one branch destination in the branch portion.

3. The non-transitory computer-readable storage medium having stored therein the game program according to claim 2, wherein
   the game program causes the computer to switch enabling and disabling of display of the entry control object.

4. The non-transitory computer-readable storage medium having stored therein the game program according to claim 2, wherein
   the game program causes the computer to switch enabling and disabling of a collision determination on the entry control object.

5. The non-transitory computer-readable storage medium having stored therein the game program according to claim 3, wherein
   the entry control object is a prompt object that prompts entry to at least one branch destination among the plurality of branch destinations and does not prompt entry to any of the other branch destinations.

6. The non-transitory computer-readable storage medium having stored therein the game program according to claim 3, wherein
   the entry control object is an entry prevention object that restricts entry to any of the other branch destinations, and
   the entry prevention object is displayed so that a virtual space behind the entry prevention object can be viewed.

7. The non-transitory computer-readable storage medium having stored therein the game program according to claim 2, wherein
the game program causes the computer to:
generate a first image including the operation target object as the operation target of the player and a second image including a second movement object other than the operation target object as an operation target of the player among the plurality of movement objects, display the first image in a first area of a display screen, and display the second image in a second area of the display screen;
switch the enabling and disabling of the entry control object in accordance with the degree of progress of the operation target object regardless of the degrees of progress of the movement objects other than the operation target object, thereby switching the branch destination that the operation target object is allowed to enter or the branch destination that the operation target object is restricted from entering in the branch portion;
switch the enabling and disabling of the entry control object in accordance with a degree of progress of the second movement object regardless of degrees of progress of the movement objects other than the second movement object, thereby switching a branch destination that the second movement object is allowed to enter or a branch destination that the second movement object is restricted from entering in the branch portion;
perform a process of enabling or disabling display of the entry control object in the first image in accordance with the degree of progress of the operation target object; and
perform a process of enabling or disabling display of the entry control object in the second image in accordance with the degree of progress of the second movement object.

8. The non-transitory computer-readable storage medium having stored therein the game program according to claim 1, wherein
the racing game is a game where the plurality of movement objects pass through a starting point on the course multiple times, and
the game program causes the computer to perform the switching so that the branch destination that the operation target object is allowed to enter or the branch destination that the operation target object is restricted from entering differs between when the operation target object passes through the starting point a first number of times and when the operation target object passes through the starting point a second number of times in the branch portion.

9. The non-transitory computer-readable storage medium having stored therein the game program according to claim 8, wherein
the game program causes the computer to perform the switching after the operation target object passes through the starting point and until the operation target object reaches the starting point next.

10. The non-transitory computer-readable storage medium having stored therein the game program according to claim 8, wherein
the game program causes the computer to perform the switching for a next lap after the operation target object passes through the branch portion in a current lap and before the operation target object enters the next lap.

11. The non-transitory computer-readable storage medium having stored therein the game program according to claim 1, wherein
the game program causes the computer to enable an object that advantageously or disadvantageously affects each of the movement objects in the racing game on the course in accordance with a degree of progress of the movement object regardless of degrees of progress of the movement objects other than the movement object.

12. The non-transitory computer-readable storage medium having stored therein the game program according to claim 11, wherein
the enabled object is set to a first state or a second state, and
if the object is enabled for the plurality of movement objects, a state of the object is common to the plurality of movement objects.

13. The non-transitory computer-readable storage medium having stored therein the game program according to claim 1, wherein
the course includes a common path through which the plurality of movement objects pass multiple times during the racing game, and
a moving direction in the common path is opposite between when the number of times the movement objects pass through the common path is a first number of times and when the number of times the movement objects pass through the common path is a second number of times.

14. The non-transitory computer-readable storage medium having stored therein the game program according to claim 13, wherein
the game program causes the computer to:
perform a process of enabling or disabling a movement change object that changes a movement form of each of the movement objects in a predetermined direction; and
perform a process of enabling or disabling the movement change object in accordance with a degree of progress of the movement object so that when the movement object moves on the common path, a direction in which a moving direction and a movement form of the movement object are changed relate to each other.

15. An information processing system including a processor for executing a racing game that progresses by moving a plurality of movement objects relating to a plurality of players in a course defined by a course object in a virtual space, wherein
the course includes a branch portion branching into a plurality of branch destinations,
the plurality of movement objects pass through the branch portion multiple times in progressing through the course, and
the processor:
based on an operation input provided by a player, moves the movement object relating to the player on the course;
allows the movement object to enter at least one branch destination among the plurality of branch destinations and restricts the movement object from entering any of the other branch destinations in the branch portion;
switches a branch destination that a first movement object relating to a first player is allowed to enter or a branch destination that the first movement object is restricted from entering in the branch portion in accordance with a degree of progress of the first movement object in the racing game; and switches a branch destination that a second movement object relating to a second player is allowed to enter or a branch destination that the second movement object is restricted from entering in the branch portion in accordance with a degree of progress of the second movement object in the racing game.

16. The information processing system according to claim 15, wherein the information processing system includes a first information processing apparatus and a second information processing apparatus, the first information processing apparatus:

moves the first movement object on the course based on an operation input provided by the first player;

allows the first movement object to enter at least one branch destination among the plurality of branch destinations and restricts the first movement object from entering any of the other branch destinations in the branch portion; and switches the branch destination that the first movement object is allowed to enter or the branch destination the first movement object is restricted from entering in the branch portion in accordance with the degree of progress of the first movement object, and the second information processing apparatus:

moves the second movement object on the course based on an operation input provided by the second player;

allows the second movement object to enter at least one branch destination among the plurality of branch destinations and restricts the second movement object from entering any of the other branch destinations in the branch portion; and switches the branch destination that the second movement object is allowed to enter or the branch destination the second movement object is restricted from entering in the branch portion in accordance with the degree of progress of the second movement object.

17. An information processing system including a processor for executing a racing game that progresses by moving a plurality of movement objects in a course defined by a course object in a virtual space, wherein the course includes a branch portion branching into a plurality of branch destinations, the plurality of movement objects pass through the branch portion multiple times in progressing through the course, and the processor is configured to:

move an operation target object as an operation target of a player among the plurality of movement objects on the course based on an operation input provided by the player;

allow the operation target object to enter at least one branch destination among the plurality of branch destinations and restrict the operation target object from entering any of the other branch destinations in the branch portion; and switch a branch destination that the operation target object is allowed to enter or a branch destination that the operation target object is restricted from entering in the branch portion in accordance with a degree of progress of the operation target object in the racing game, regardless of degrees of progress of the movement objects other than the operation target object in the racing game.

18. An information processing method for executing in an information processing system a racing game that progresses by moving a plurality of movement objects in a course defined by a course object in a virtual space, wherein the course includes a branch portion branching into a plurality of branch destinations, the plurality of movement objects pass through the branch portion multiple times in progressing through the course, and the information processing method comprises:

moving an operation target object as an operation target of a player among the plurality of movement objects on the course based on an operation input provided by the player;

allowing the operation target object to enter at least one branch destination among the plurality of branch destinations and restrict the operation target object from entering any of the other branch destinations in the branch portion; and switching a branch destination that the operation target object is allowed to enter or a branch destination that the operation target object is restricted from entering in the branch portion in accordance with a degree of progress of the operation target object in the racing game, regardless of degrees of progress of the movement objects other than the operation target object in the racing game.

* * * * *